(12) United States Patent
Hsieh

(10) Patent No.: US 11,506,866 B2
(45) Date of Patent: Nov. 22, 2022

(54) OPTICAL IMAGING LENS, IMAGING DEVICE, AND ELECTRONIC DEVICE

(71) Applicant: ZHONG YANG TECHNOLOGY CO., LTD., Taichung (TW)

(72) Inventor: Tien-Liang Hsieh, Taichung (TW)

(73) Assignee: ZHONG YANG TECHNOLOGY CO., LTD., Taichung (TW)

( * ) Notice: Subject to any disclaimer, the term of this patent is extended or adjusted under 35 U.S.C. 154(b) by 320 days.

(21) Appl. No.: 17/006,915

(22) Filed: Aug. 31, 2020

(65) Prior Publication Data

US 2022/0019056 A1    Jan. 20, 2022

Related U.S. Application Data

(60) Provisional application No. 63/053,742, filed on Jul. 20, 2020.

(51) Int. Cl.
| | |
|---|---|
| *G02B 9/60* | (2006.01) |
| *G02B 3/04* | (2006.01) |
| *H04N 5/225* | (2006.01) |
| *G02B 7/182* | (2021.01) |
| *G02B 13/18* | (2006.01) |
| *G02B 13/00* | (2006.01) |

(52) U.S. Cl.
CPC .............. *G02B 9/60* (2013.01); *G02B 3/04* (2013.01); *G02B 7/1822* (2013.01); *H04N 5/2254* (2013.01); *G02B 13/0045* (2013.01); *G02B 13/18* (2013.01)

(58) Field of Classification Search
CPC ...... G02B 13/0045; G02B 13/18; G02B 3/04; G02B 9/60; G02B 7/1822; H04N 5/2254

USPC ................................ 359/714, 739, 763, 764
See application file for complete search history.

(56) References Cited

U.S. PATENT DOCUMENTS

| | | | | |
|---|---|---|---|---|
| 2016/0124182 A1* | 5/2016 | Hsu | ..................... | G02B 13/0045 359/714 |
| 2016/0161718 A1* | 6/2016 | Koreeda | ............ | G02B 13/0045 359/714 |

(Continued)

FOREIGN PATENT DOCUMENTS

| | | |
|---|---|---|
| EP | 2 579 080 A1 | 4/2013 |
| TW | 201333522 A1 | 8/2013 |

(Continued)

*Primary Examiner* — Evelyn A Lester
(74) *Attorney, Agent, or Firm* — Winston Hsu

(57) ABSTRACT

An optical imaging lens including, in order from an object side to an image side, an aperture, a first lens, a second lens, a third lens, a fourth lens and a fifth lens, wherein the first lens has positive refractive power and includes a convex image-side surface; the second lens has negative refractive power and includes a convex object-side surface and a concave image-side surface; the third lens has positive refractive power and is biconvex; the fourth lens has positive refractive power and includes a concave object-side surface and a convex image-side surface; the fifth lens has negative refractive power and includes a convex object-side surface and a concave image-side surface. The object-side and image-side surfaces of the third lens, the fourth lens, and the fifth lens are aspheric. The optical imaging lens includes a total of five elements.

11 Claims, 15 Drawing Sheets

(56) References Cited

U.S. PATENT DOCUMENTS

| | | | |
|---|---|---|---|
| 2016/0161722 A1* | 6/2016 | Hsu | G02B 13/18 |
| | | | 359/714 |
| 2016/0252708 A1* | 9/2016 | Chung | G02B 13/0045 |
| | | | 359/714 |
| 2016/0377831 A1* | 12/2016 | Liu | G02B 13/0045 |
| | | | 359/714 |
| 2016/0377832 A1* | 12/2016 | Liu | G02B 9/60 |
| | | | 359/714 |
| 2018/0113281 A1* | 4/2018 | Tsai | G02B 5/208 |
| 2022/0137372 A1* | 5/2022 | Chen | G02B 27/0025 |
| | | | 359/714 |

FOREIGN PATENT DOCUMENTS

| | | |
|---|---|---|
| TW | 201433820 A | 9/2014 |
| TW | 201439581 A | 10/2014 |
| TW | 201533464 A | 9/2015 |
| TW | 201534960 A | 9/2015 |
| WO | 2011/152506 A1 | 12/2011 |

\* cited by examiner

OPTICAL IMAGING LENS, IMAGING DEVICE, AND ELECTRONIC DEVICE

CROSS REFERENCE TO RELATED APPLICATIONS

This application claims priority to U.S. Provisional Application Ser. No. 63/053,742, filed Jul. 20, 2020, which is herein incorporated by reference.

BACKGROUND OF THE INVENTION

1. Field of the Invention

The present disclosure is related to an optical imaging lens, and more particularly, to an optical imaging lens and an optical imaging device applicable to an electronic device.

2. Description of the Prior Art

With the advancement of semiconductor manufacturing technology, the image sensors (such as CCD and CMOS Image Sensor) could be made with a reduced size to meet the requirement of miniaturized photographing devices. This improvement enables consumer electronic products to have miniaturized photographing devices equipped therein so as to increase their added values. Taking portable electronic devices such as smartphones as an example, because of its convenience and portability, today's consumers often use smartphones to take pictures instead of using traditional digital cameras. Consumers' expectation for the portable electronic devices keeps on growing. In addition to having a sophisticated look, the portable electronic devices also have to be compact and light-weight. Therefore, this trend has made it necessary for the miniaturized photographing devices to be further miniaturized in its volume so as to be accommodated in a thin and compact portable electronic device.

Furthermore, consumers also demand an increased imaging quality for miniaturized cameras. In addition to providing a sharp image, it is also expected to have a wide field of view and good thermal stability to meet different application needs in various situations. Hence, a further need exists for a miniaturized camera which could provide good image quality and have good thermal stability.

SUMMARY OF THE INVENTION

Therefore, the present disclosure provides an optical imaging lens including, in order from an object-side to an image side, an aperture, a first lens, a second lens, a third lens, a fourth lens and a fifth lens, wherein the first lens has positive refractive power and includes an image-side surface being convex; the second lens has negative refractive power and includes an object-side surface being convex and an image-side surface being concave; the third lens has positive refractive power and includes a convex object-side surface and a convex image-side surface which are both aspheric; the fourth lens has positive refractive power and includes a concave object-side surface and a convex image-side surface which are both aspheric; the fifth lens has negative refractive power and includes a convex object-side surface and a concave image-side surface which are both aspheric; each of the object-side surface and the image-side surface of the fifth lens includes at least one inflection point; wherein, the optical imaging lens includes a total number of five lens elements; the following conditions are satisfied:

$dNd1/dT \leq 1 \times 10^{-5}$;

$-3.5 \leq f2*(1/f3+1/f4) \leq -1$; and $0.24 \leq (CT3+CT4)/TTL \leq 0.39$;

where, dNd1/dT is a temperature coefficient of refractive index of the first lens; f2 is a focal length of the second lens; f3 is a focal length of the third lens; f4 is a focal length of the fourth lens; CT3 is a thickness of the third lens on an optical axis of the optical imaging lens; CT4 is a thickness of the fourth lens on the optical axis of the optical imaging lens; TTL is a total track length of the optical imaging lens.

According to an embodiment of the present disclosure, wherein a curvature radius of the image-side surface of the second lens is R4; a curvature radius of the object-side surface of the third lens is R5, and the following condition is satisfied:

$0 < R4/R5 \leq 0.5$.

According to an embodiment of the present disclosure, wherein a distance from the image-side surface of the second lens to the object-side surface of the third lens along the optical axis of the optical imaging lens is AT23; a distance from the image-side surface of the third lens to the object-side surface of the fourth lens along the optical axis of the optical imaging lens is AT34, and the following condition is satisfied:

$0.8 \leq AT23/AT3 \leq 43.5$.

According to an embodiment of the present disclosure, wherein an abbe number of the second lens is Vd2, an abbe number of the fifth lens is Vd5, and the following condition is satisfied:

$|Vd5-Vd2| \leq 15$.

According to an embodiment of the present disclosure, wherein an abbe number of the first lens is Vd1, and the following condition is satisfied:

$Vd1 \geq 40$.

According to an embodiment of the present disclosure, wherein a total track length of the optical imaging lens is TTL, a maximum image height of the optical imaging lens is ImgH, and the following condition is satisfied:

$1.9 \leq TTL/ImgH \leq 2.2$.

According to an embodiment of the present disclosure, wherein an object-side surface of the first lens is convex.

According to an embodiment of the present disclosure, wherein an off-axis region of the object-side surface of the fifth lens is concave.

According to an embodiment of the present disclosure, wherein an off-axis region of the image-side surface of the fifth lens is convex.

The present disclosure further provides an imaging device which includes the optical imaging lens mentioned above and an image sensor, wherein the image sensor is disposed on an image plane of the optical imaging lens.

The present disclosure further provides an electronic device including the aforementioned imaging device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present disclosure will be described hereinafter with reference to the appended drawings. It is to be noted that all the drawings are shown for the purpose of illustrating the technical concept of the present disclosure or embodiments thereof, in which.

DETAILED DESCRIPTION

Figure 1A:
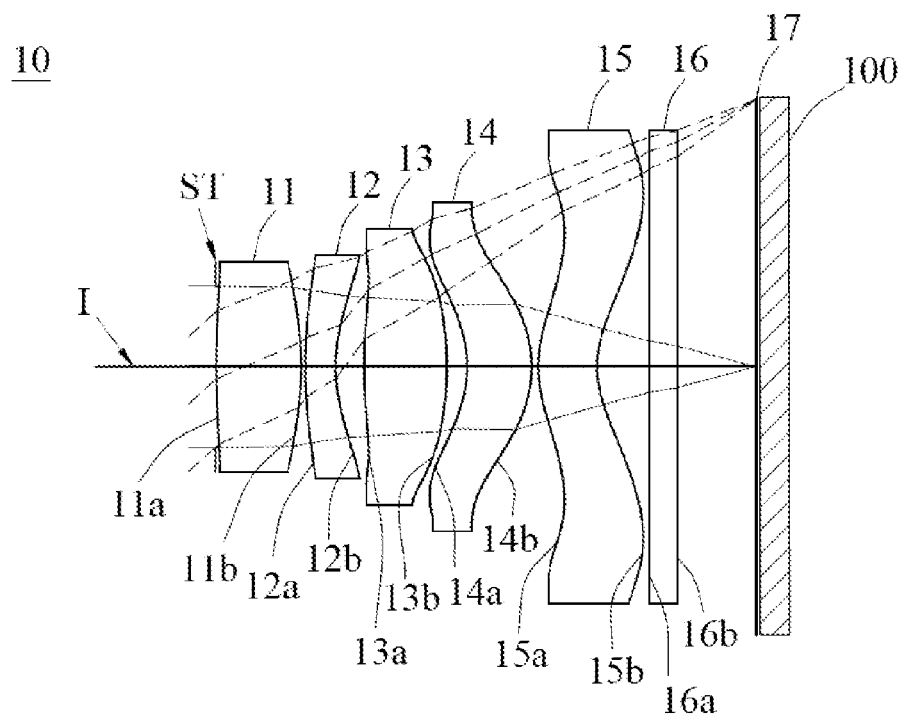
FIG. 1A shows longitudinal spherical aberration curves, astigmatic field curves and a distortion curve of the optical imaging lens according to the first embodiment of the present disclosure.

According to the embodiments of the present disclosure, each lens element of the optical imaging lens can be made of glass or plastic materials and is not limited to the material shown in the embodiments. When a lens element is made of glass material, the surfaces of the lens could be processed with grinding or molding methods. In addition, a glass lens can have high thermal stability and good hardness, which mitigates the environmental temperature effects on the optical imaging lens, such that the service life of the optical imaging lens could be extended. When a plastic lens element is utilized, it is favorable to reduce the total weight of the optical imaging lens and lower the production cost.

According to the embodiments of the present disclosure, each lens element of the optical imaging lens includes an object-side surface facing an imaged object, and an image-side surface facing an image plane. The surface shape of a les element is considered as being convex or concave according to a shape at a paraxial region of the lens element. The paraxial region is an area near the optical axis within the optical imaging lens. For example, a lens element which has a convex shape at the paraxial region of the object-side surface is defined as having an object-side surface being convex. That is, although the object-side surface of the lens element is considered as being convex, but an off-axis region thereof could have a convex shape or a concave shape. Further, the surface shape at the paraxial region of a lens element is determined by a curvature radius of the surface of the lens element, depending on the curvature radius is positive or negative. For example, if a curvature radius of an object-side surface of a lens element is positive, the object-side surface of the lens elements is convex. On the contrary, if the curvature radius thereof is negative, the object-side surface of the lens element is concave. For an image-side surface of a lens element, if a curvature radius thereof is positive, the image-side surface of the lens element is concave; on the contrary, if the curvature radius thereof is negative, the image-side surface of the lent element is convex.

According to the embodiments of the present disclosure, an object-side surface and an image-side surface of a lens element can be spherical or aspheric surfaces. When a lens element is formed with aspheric surface, it is favorable to correct image aberration of the optical imaging lens, such as spherical aberration, and could reduce a total number of the lens elements of the optical imaging lens. However, aspheric lens will increase the manufacturing cost of the optical imaging lens. In the exemplary embodiments of the present disclosure, some lens surfaces are formed as spherical surfaces, but the lens surfaces also could be formed as aspheric surfaces depending on the design requirement. Alternatively, some lens surfaces are formed as aspheric surfaces, but the lens surfaces also could be formed as spherical surfaces if necessary.

According to the embodiments of the present disclosure, a total track length (TTL) of the optical imaging lens is defined as a distance from the object-side surface of the first lens to the image plane of the optical imaging lens along the optical axis. A maximum image height of the optical imaging lens is abbreviated as ImgH. When an image sensor is disposed on the image plane, the maximum image height ImgH is a half of the diagonal length of effective sensing region of the image sensor. In the following embodiments, the units of the curvature radii, the thickness of the lens elements, the distances between the lens elements, the total track length TTL, the maximum image height ImgH and focal length are millimeters.

The present disclosure provides an optical imaging lens including, in order from an object-side to an image side, an aperture, a first lens, a second lens, a third lens, a fourth lens and a fifth lens, wherein the first lens has positive refractive power and includes an image-side surface being convex; the second lens has negative refractive power and includes an object-side surface being convex and an image-side surface being concave; the third lens has positive refractive power and includes an object-side surface being convex and an image-side surface being convex which are both aspheric surfaces; the fourth lens has positive refractive power and includes an object-side surface being concave and an image-side surface being convex which are both aspheric surfaces; the fifth lens has negative refractive power and includes an object-side surface being convex and an image-side surface being concave which are both aspheric surfaces; each of the object-side surface and the image-side surface of the fifth lens includes at least one inflection point; the optical imaging lens includes a total number of five lens elements.

The first lens has positive refractive power and includes the image-side surface being convex. The first lens is used as a converging lens to collect light to form an image. Preferably, the first lens is made of glass material; an object-side surface and/or the image-side surface of the first lens are aspheric. When the first lens is made of glass material, it is favorable to mitigate thermal drift of a focal plane of the optical imaging lens and thereby lowering an effect of temperature on image quality. When the object-side and/or image-side surface of the first lens are aspheric, it is favorable to correct spherical aberration.

The second lens has negative refractive power and is convex on the object-side surface and concave on the image-side surface. The second lens is adapted to adjust a propagation path of the collecting light. Preferably, the second lens is formed of a material having a small abbe number, for example, an abbe number which is smaller than 40, for correcting chromatic aberration.

The third lens and the fourth lens both have positive refractive powers. Both of the object-side and the image-side surfaces of the third lens are convex. The object-side surface of the fourth lens is concave and the image-side surface of the fourth lens is convex. By arranging the third lens and the fourth lens sequentially along the optical axis, a positive refractive power could be suitably distributed on the third lens and the fourth lens such that it is favorable to increase thickness uniformity of the third lens and the fourth lens and correct astigmatism aberration. Furthermore, by controlling a ratio between the focal lengths of the second lens, the third lens and the fourth lens, it is favorable to compensate thermal drift of the focal plane of the optical imaging lens, thereby increasing thermal stability thereof.

The fifth lens has negative refractive power and is convex on the object-side surface and is concave on the image-side surface. When each of the object-side surface and the image-side surface has at least one inflection point, it is favorable to minimize a total track length of the optical imaging lens and to adjust a light incident angle on the image plane to increase brightness uniformity from a center area to an edge region of an image sensor.

When the focal length of the second lens is f2, the focal length of the third lens is f3, and the focal length of the fourth lens is f4, the following condition (1) is satisfied: $-3.5 \leq f2*(1/f3+1/f4) \leq -1$ (1). Therefore, thermal drift of the optical imaging lens can be effectively compensated and temperature effect on the image quality could be lowered.

Preferably, when a temperature coefficient of refractive index of the first lens is dNd1/dT, the following condition (2) is satisfied: $dNd1/dT \leq 1 \times 10^{-5}$ (2). The condition (2) represents that the first lens is made of glass material and variation of refractive index with respect to temperature is less than or equal to $1 \times 10^{-5}/°C$., and therefore it can further mitigate thermal drift of the optical imaging lens and improve thermal stability.

Preferably, when a curvature radius of the image-side surface of the second lens is R4, and a curvature radius of the object-side surface of the third lens is R5, the following condition (3) is satisfied: $0 < R4/R5 \leq 0.5$ (3). Therefore, a ratio between the curvature radius R4 and R5 can be suitably controlled such that it is favorable to correct coma aberration of the optical imaging lens.

When a thickness of the third lens on the optical axis of the optical imaging lens is CT3, a thickness of the fourth lens on the optical axis of the optical imaging lens is CT4, and a total track length of the optical imaging lens is TTL, the following condition (4) is satisfied: $0.24 \leq (CT3+CT4)/TTL \leq 0.39$ (4). Therefore, it is favorable to control a ratio between the thickness CT3 of the third lens, the thickness CT4 of the fourth lens and the total track length TTL. When (CT3+CT4)/TTL is less than the lower limit of the condition (4), astigmatism aberration cannot be properly corrected. On the other hand, when (CT3+CT4)/TTL is greater than the upper limit of the condition (4), it is not favorable to compensate thermal drift.

When a distance from the image-side surface of the second lens to the object-side surface of the third lens along the optical axis is AT23, and a distance from the image-side surface of the third lens to the object-side surface of the fourth lens along the optical axis is AT34, the following condition (5) is satisfied: $0.8 \leq AT23/AT34 \leq 3.5$ (5). Therefore, a ratio between the distance AT23 and the distance AT34 can be suitably controlled. When AT23/AT34 is less than the lower limit of the condition (5), it is not favorable to correct astigmatism aberration. When AT23/AT34 is lower than the upper limit of the condition (5), assembling sensitivity of the optical imaging lens can be improved, thereby increasing manufacturability of the optical imaging lens.

When an abbe number of the second lens is Vd2, and an abbe number of the fifth lens is Vd5, the following condition (6) is satisfied: $|Vd5-Vd2| \leq 15$ (6). Therefore, chromatic aberration of the optical imaging lens can be effectively corrected.

When an abbe number of the first lens is Vd1, the following condition (7) is satisfied: $Vd1 \geq 40$ (7). Therefore, chromatic aberration of the optical imaging lens can be further corrected.

The total track length of the optical imaging lens is TTL, the maximum image height is ImgH, and the following condition (8) is satisfied: $1.9 \leq TTL/ImgH \leq 2.2$ (8). Therefore, it is favorable to improve the assembling process of the optical imaging lens and can also miniaturize the optical imaging lens. When TTL/ImgH is less than the lower limit of the condition (8), it may increase tolerance sensitivity of the optical imaging lens which affects the assembling yield. When TTL/ImgH is greater than the upper limit of the condition (8), it may increase the volume of the optical imaging lens and cannot meet the purpose of miniaturizing the optical imaging lens.

First Embodiment

Figure 1B:
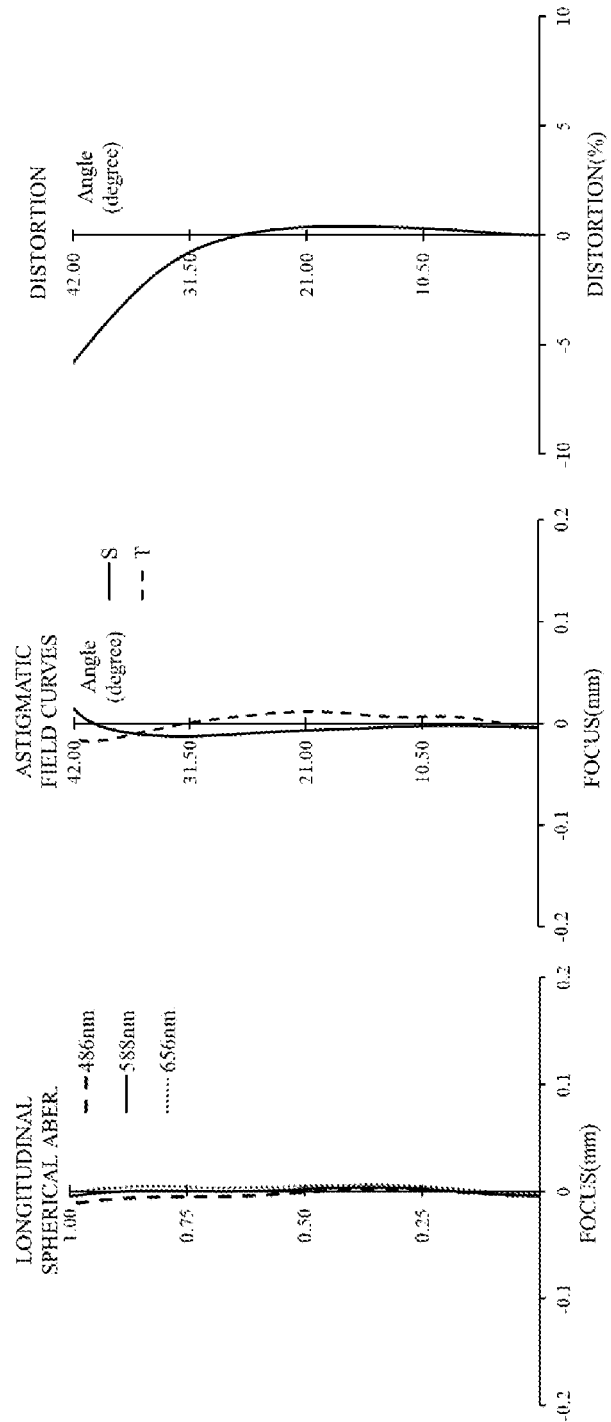
FIG. 1B shows longitudinal spherical aberration curves, astigmatic field curves and a distortion curve of the optical imaging lens according to the first embodiment.

FIG. 1A is a schematic view of an optical imaging lens according to the first embodiment of the present disclosure. FIG. 1B shows, in order from left to right, longitudinal spherical aberration curves, astigmatic field curves and a distortion curve of the optical imaging lens according to the first embodiment.

As shown in FIG. 1A, the optical imaging lens 10 of the first embodiment includes, in order from an object-side to an image side, an aperture ST, a first lens 11, a second lens 12, a third lens 13, a fourth lens 14 and a fifth lens 15. The optical imaging lens 10 can further include a filter element 16 and an image plane 17. An image sensor 100 can be disposed on the image plane 17 to form an imaging device (not labeled).

The first lens 11 has positive refractive power and includes an object-side surface 11a being convex and an image-side surface 11b being convex, wherein both of the object-side surface 11a and the image-side surface 11b of the first lens 11 are formed as aspheric surfaces. The first lens 11 is made of glass material.

The second lens 12 has negative refractive power and includes an object-side surface 12a being convex and an image-side surface 12b being concave, wherein both of the object-side surface 12a and the image-side surface 12b of the second lens 12 are formed as aspheric surfaces. The second lens 12 is made of plastic material.

The third lens 13 has positive refractive power and includes an object-side surface 13a being convex and an image-side surface 13b being convex, wherein both of the object-side surface 13a and the image-side surface 13b of the third lens 13 are formed as aspheric surfaces. More detail, the object-side surface 13a of the third lens 13 is convex in a paraxial region thereof, while an off-axis region of the object-side surface 13a is concave; the image-side surface 13b of the third lens 13 is convex in both of a paraxial region and an off-axis region thereof. The third lens 13 is made of plastic material.

The fourth lens 14 has positive refractive power and includes an object-side surface 14a being concave and an image-side surface 14b being convex, wherein both of the object-side surface 14a and the image-side surface 14b of the fourth lens 14 are formed as aspheric surfaces. More detail, the object-side surface 14a of the fourth lens 14 is concave in a paraxial region thereof, while an off-axis region of the object-side surface 14a is convex; the image-side surface 14b of the fourth lens 14 is convex in a paraxial region thereof, while an off-axis region of the image-side surface 14b is concave. The fourth lens 14 is made of plastic material.

The fifth lens 15 has negative refractive power and includes an object-side surface 15a being convex and an image-side surface 15b being concave, wherein both of the object-side surface 15a and the image-side surface 15b of the fifth lens 15 are formed as aspheric surfaces. More detail, the object-side surface 15a of the fifth lens 15 is convex in a paraxial region thereof, while an off-axis region thereof is concave; the image-side surface 15b of the fifth lens 15 is concave in a paraxial region thereof, while an off-axis region thereof is convex, wherein each of the object-side surface 15a and the image-side surface 15b includes two inflection points which are symmetrical to the optical axis I. The fifth lens 15 is made of plastic material.

The filter element 16 is disposed between the fifth lens 15 and the image plane 17, and adapted to filter out light of predetermined wavelengths. For example, the filter element 16 can be an IR-cut filter for filtering out infrared light. Both surfaces 16a, 16b of the filter element 16 are flat surfaces. The filter element 16 is made of glass material.

The image sensor 100 can be a CCD (Charge-Coupled Device) image sensor or a CMOS (Complementary Metal-Oxide-Semiconductor) image sensor, for example.

The equation of the aspheric surface profiles is expressed as follows:

$$X(Y) = \frac{Y^2}{R} \bigg/ \left(1 + \sqrt{1 - (1+K)\frac{Y^2}{R^2}}\right) + \sum_{i=1}^{n} A_i \times Y^i$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and $A_i$ is the i-th aspheric coefficient.

Referring to Table 1, which provides the optical parameters of the optical imaging lens 10 according to the first embodiment. In Table 1, each surface number is referred to one lens surface. For example, the object-side surface of the first lens 11 is denoted as surface 11a; the image-side surface of the first lens 11 is denoted as surface 11b, and so on. The symbol "ASP" in the column next to the surface number is used to define that a shape of the lens surface is aspheric; while the symbol "Plano" is used to define that the lens surface is flat. The value in the distance column denotes a distance from a lens surface to a next lens surface along the optical axis I. For example, the distance from the object-side surface 11a to the image-side surface 11b is 0.645 mm, which means that a thickness of the first lens 11 on the optical axis is 0.645 mm. Similarly, the distance from the image-side surface 11b of the first lens 11 to the object-side surface 12a of the second lens 12 is 0.03 mm, and so on. In the following embodiments, the optical parameters have the same definitions as Table 1 and the duplicated description would be omitted for brevity. In the upper row of Table 1, an effective focal length is abbreviated as EFL, f-number is abbreviated as Fno, half of a maximum filed is abbreviated as HFOV, and the corresponding values thereof are also shown therein.

TABLE 1

| First Embodiment EFL = 2.39 mm, Fno = 1.95, HFOV = 42 deg | | | | | | | |
|---|---|---|---|---|---|---|---|
| | Surface | Surface Type | Curvature Radius (mm) | Distance (mm) | Refractive Index | Abbe Number | Focal Length (mm) | Material |
| Object | | | Infinite | Infinite | | | | |
| Aperture | ST | | Infinite | 0.007 | | | | |
| First | 11a | ASP | 6.379 | 0.645 | 1.690 | 52.8 | 2.37 | Glass |
| Lens | 11b | ASP | −2.103 | 0.030 | | | | |
| Second | 12a | ASP | 3.885 | 0.230 | 1.661 | 20.4 | −2.59 | Plastic |
| Lens | 12b | ASP | 1.161 | 0.217 | | | | |
| Third | 13a | ASP | 3.433 | 0.628 | 1.544 | 55.9 | 2.89 | Plastic |
| Lens | 13b | ASP | −2.710 | 0.155 | | | | |
| Fourth | 14a | ASP | −0.867 | 0.485 | 1.544 | 55.9 | 19.02 | Plastic |
| Lens | 14b | ASP | −0.958 | 0.050 | | | | |
| Fifth | 15a | ASP | 0.945 | 0.446 | 1.661 | 20.4 | −72.89 | Plastic |
| Lens | 15b | ASP | 0.753 | 0.398 | | | | |

TABLE 1-continued

First Embodiment
EFL = 2.39 mm, Fno = 1.95, HFOV = 42 deg

| | Surface | Surface Type | Curvature Radius (mm) | Distance (mm) | Refractive Index | Abbe Number | Focal Length (mm) | Material |
|---|---|---|---|---|---|---|---|---|
| Filter element | 16a | Plano | Infinite | 0.210 | 1.517 | 64.2 | | Glass |
| | 16b | Plano | Infinite | 0.600 | | | | |
| Image Plane | 17 | Plano | Infinite | | | | | |

Reference Wavelength: 588 nm

Table 2 below lists the values of the aspheric coefficients used in the above equation for each of the aspheric surfaces indicated in Table 1, wherein K is the conic coefficient; $A_4$-$A_{15}$ are the 4th order to the 16th order aspheric coefficients, respectively. For example, the conic coefficient K of the image-side surface 11b of the first lens 11 is −28.2, and so on. In the following description, the tables for each of the optical imaging lens of other embodiments use the same definition as the first embodiment. Therefore, the duplicated description would be omitted for brevity.

TABLE 2

First Embodiment_ Aspheric Coefficients

| Surface | 11a | 11b | 12a | 12b | 13a | 13b |
|---|---|---|---|---|---|---|
| K | 0.00E+00 | −2.82E+01 | 8.90E+00 | 5.23E−01 | −9.90E+01 | −5.84E+00 |
| $A_4$ | −4.93E−02 | 2.99E−02 | −2.20E−02 | −6.82E−01 | 1.67E−01 | −7.60E−02 |
| $A_6$ | 1.84E−02 | −1.10E−01 | 1.78E−01 | 1.34E+00 | −8.52E−01 | −2.05E−01 |
| $A_8$ | −1.22E−01 | −1.80E−01 | −9.37E−01 | −2.74E+00 | 1.84E+00 | 3.83E−01 |
| $A_{10}$ | 1.55E−01 | 3.71E−01 | 1.22E+00 | 2.64E+00 | −2.71E+00 | −3.18E−01 |
| $A_{12}$ | 7.80E−07 | 8.24E−07 | −4.90E−01 | −1.21E+00 | 1.58E+00 | 7.67E−02 |
| $A_{14}$ | 0.00E+00 | 0.00E+00 | 0.00E+00 | 0.00E+00 | 0.00E+00 | 4.68E−02 |
| $A_{16}$ | 0.00E+00 | 0.00E+00 | 0.00E+00 | 0.00E+00 | 0.00E+00 | 0.00E+00 |

| Surface | 14a | 14b | 15a | 15b |
|---|---|---|---|---|
| K | −7.27E+00 | −7.45E−01 | −4.48E+00 | −2.87E+00 |
| $A_4$ | −4.25E−01 | −2.66E−02 | −1.60E−01 | −2.12E−01 |
| $A_6$ | 5.07E−01 | 2.11E−01 | 1.33E−02 | 1.44E−01 |
| $A_8$ | 1.09E−01 | −9.02E−02 | 5.47E−02 | −7.53E−02 |
| $A_{10}$ | −2.49E−01 | 1.43E−01 | −5.81E−02 | 2.39E−02 |
| $A_{12}$ | 4.61E−02 | −1.18E−01 | 2.37E−02 | −4.28E−03 |
| $A_{14}$ | 1.10E−02 | 2.95E−02 | −3.29E−03 | 3.50E−04 |
| $A_{16}$ | 0.00E+00 | 0.00E+00 | 0.00E+00 | 0.00E+00 |

In the first embodiment, the focal length of the second lens 12 is f2, the focal length of the third lens 13 is f3, the focal length of the fourth lens 14 is f4, and they satisfy the condition: $f2*(1/f3+1/f4)=-1.03$.

In the first embodiment, the temperature coefficient of refractive index of the first lens 11 is dNd1/dT which satisfy the condition: $dNd1/dT=2.02\times10^{-6}$ [1/° C.].

In the first embodiment, the curvature radius of the image-side surface 12b of the second 12 lens is R4, the curvature radius of the object-side surface 13a of the third lens 13 is R5, and they satisfy the condition: R4/R5=0.34.

In the first embodiment, the thickness of the third lens 13 on the optical axis is CT3, the thickness of the fourth lens 14 on the optical axis is CT4, the total track length of the optical imaging lens 10 is TTL, and they satisfy the condition: (CT3+CT4)/TTL=0.27.

In the first embodiment, the distance from the image-side surface 12b of the second lens 12 to the object-side surface 13a of the third lens 13 along the optical axis is AT23, the distance from the image-side surface 13b of the third lens 13 to the object-side surface 14a of the fourth lens 14 is AT34, and they satisfy the condition: AT23/AT34=1.40.

In the first embodiment, the abbe number of the second lens 12 is Vd2, the abbe number of the fifth lens 15 is Vd5, and they satisfy the condition: Vd5-Vd2=0.

In the first embodiment, the abbe number of the first lens 11 is Vd1 and Vd1=52.8.

In the first embodiment, the total track length of the optical imaging lens 10 is TTL, the maximum image height on the image plane of the optical imaging lens 10 is ImgH, and they satisfy the condition: TTL/ImgH=2.02.

From the values of the above conditions, the optical imaging lens 10 of the first embodiment satisfies the conditions (1) to (8).

Referring to FIG. 1B, in order from left to right, which shows longitudinal spherical aberration curves, astigmatic field curves and a distortion curve of the optical imaging lens 10 according to the first embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.02 mm. From the astigmatism field aberration curves at the reference wavelength 588 nm, the aberration of the sagittal curves in the whole field range falls within +0.02 mm; the aberration of the tangential curves in the whole field range falls within +0.02 mm. From the distortion aberration curves, the distortion aberration can be controlled within a range of 6%. Hence, the optical imaging lens 10 of the first embodiment is effectively to reduce aberration and can provide good imaging quality.

Second Embodiment

Figure 2A:
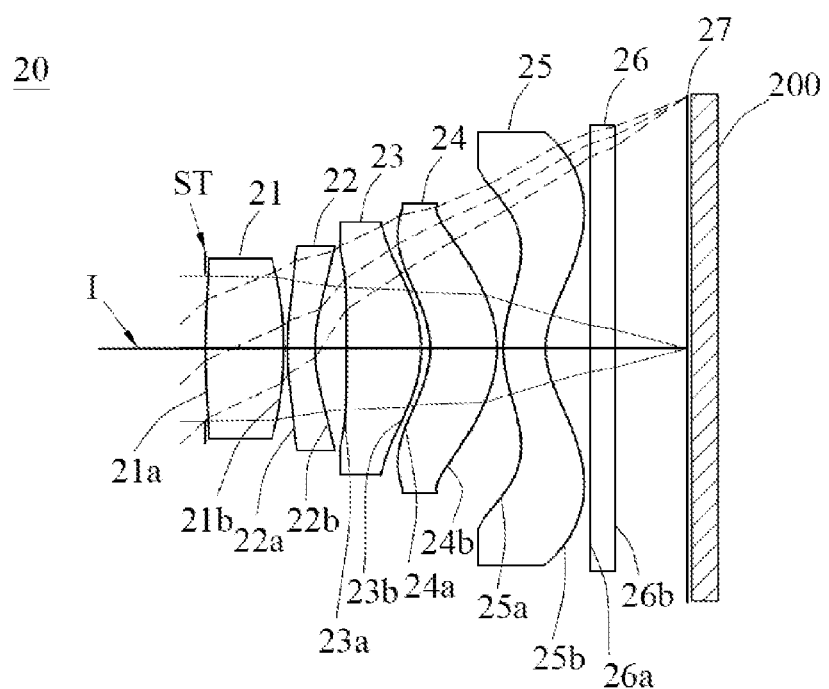
FIG. 2A is a schematic view of an optical imaging lens according to a second embodiment of the present disclosure.
Figure 2B:
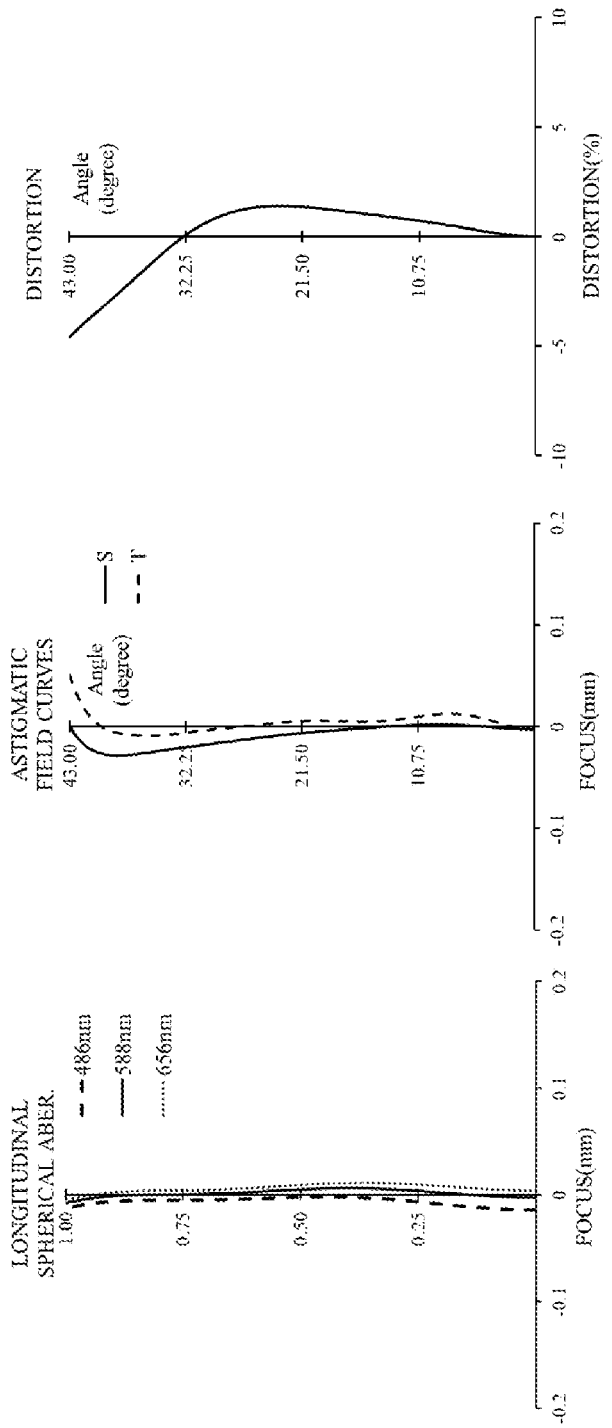
FIG. 2B shows longitudinal spherical aberration curves, astigmatic field curves and a distortion curve of the optical imaging lens according to the second embodiment.

FIG. 2A is a schematic view of an optical imaging lens according to the second embodiment of the present disclosure. FIG. 2B shows, in order from left to right, longitudinal spherical aberration curves, astigmatic field curves and a distortion curve of the optical imaging lens according to the second embodiment.

As shown in FIG. 2A, the optical imaging lens 20 of the second embodiment includes, in order from an object-side to an image side, an aperture ST, a first lens 21, a second lens 22, a third lens 23, a fourth lens 24 and a fifth lens 25. The optical imaging lens 20 can further include a filter element 26 and an image plane 27. An image sensor 200 can be disposed on the image plane 27 to form an imaging device (not labeled).

The first lens 21 has positive refractive power and includes an object-side surface 21a being convex and an image-side surface 21b being convex, wherein both of the object-side surface 21a and the image-side surface 21b of the first lens 21 are formed as aspheric surfaces. The first lens 21 is made of glass material.

The second lens 22 has negative refractive power and includes an object-side surface 22a being convex and an image-side surface 22b being concave, wherein both of the object-side surface 22a and the image-side surface 22b of the second lens 22 are formed as aspheric surfaces. The second lens 22 is made of plastic material.

The third lens 23 has positive refractive power and includes an object-side surface 23a being convex and an image-side surface 23b being convex, wherein both of the object-side surface 23a and the image-side surface 23b of the third lens 23 are formed as aspheric surfaces. More detail, the object-side surface 23a of the third lens 23 is convex in a paraxial region thereof, while an off-axis region of the object-side surface 23a is concave; the image-side surface 23b of the third lens 23 is convex in both of a paraxial region and an off-axis region thereof. The third lens 23 is made of plastic material.

The fourth lens 24 has positive refractive power and includes an object-side surface 24a being concave and an image-side surface 24b being convex, wherein both of the object-side surface 24a and the image-side surface 24b of the fourth lens 24 are formed as aspheric surfaces. More detail, the object-side surface 24a of the fourth lens 24 is concave in a paraxial region thereof, while an off-axis region of the object-side surface 24a is convex. The fourth lens 24 is made of plastic material.

The fifth lens 25 has negative refractive power and includes an object-side surface 25a being convex and an image-side surface 25b being concave, wherein both of the object-side surface 25a and the image-side surface 25b of the fifth lens 25 are formed as aspheric surfaces. More detail, the object-side surface 25a of the fifth lens 25 is convex in a paraxial region thereof, while an off-axis region of the object-side surface 25a is concave; the image-side surface 25b of the fifth lens 25 is concave in a paraxial region thereof, while an off-axis region of the image-side surface 25b is convex, wherein each of the object-side surface 25a and the image-side surface 25b includes two inflection points which are symmetrical to the optical axis I. The fifth lens 25 is made of plastic material.

The filter element 26 is disposed between the fifth lens 25 and the image plane 27, and adapted to filter out light of predetermined wavelengths. For example, the filter element 26 can be an IR-cut filter for filtering out infrared light. Both surfaces 26a, 26b of the filter element 26 are flat surfaces. The filter element 26 is made of glass material.

The image sensor 200 can be a CCD (Charge-Coupled Device) image sensor or a CMOS (Complementary Metal-Oxide-Semiconductor) image sensor, for example.

Referring to Table 3 and Table 4, wherein Table 3 shows the optical parameters of the optical imaging lens 20 according to the second embodiment of the present disclosure; Table 4 lists the values of the aspheric coefficients for each of the aspheric surfaces indicated in Table 3.

TABLE 3

Second Embodiment
EFL = 2.35 mm, Fno = 1.95, HFOV = 43 deg

|  | Surface | Surface Type | Curvature Radius (mm) | Distance (mm) | Refractive Index | Abbe Number | Focal Length (mm) | Material |
|---|---|---|---|---|---|---|---|---|
| Object |  |  | Infinite | Infinite |  |  |  |  |
| Aperture | ST |  | Infinite | 0.007 |  |  |  |  |
| First | 21a | ASP | 6.106 | 0.648 | 1.690 | 52.8 | 3.13 | Glass |
| Lens | 21b | ASP | −3.203 | 0.030 |  |  |  |  |
| Second | 22a | ASP | 2.082 | 0.230 | 1.661 | 20.4 | −5.47 | Plastic |
| Lens | 22b | ASP | 1.263 | 0.260 |  |  |  |  |
| Third | 23a | ASP | 106.176 | 0.621 | 1.544 | 55.9 | 1.92 | Plastic |
| Lens | 23b | ASP | −1.051 | 0.074 |  |  |  |  |
| Fourth | 24a | ASP | −0.758 | 0.552 | 1.544 | 55.9 | 22.70 | Plastic |
| Lens | 24b | ASP | −0.898 | 0.050 |  |  |  |  |
| Fifth | 25a | ASP | 0.974 | 0.350 | 1.661 | 20.4 | −4.48 | Plastic |
| Lens | 25b | ASP | 0.628 | 0.368 |  |  |  |  |
| Filter | 26a | Plano | Infinite | 0.210 |  |  |  | Glass |
| element | 26b | Plano | Infinite | 0.600 |  |  |  |  |
| Image Plane | 27 | Plano | Infinite |  |  |  |  |  |

Reference Wavelength: 588 nm

TABLE 4

| | Second Embodiment_ Aspheric Coefficients | | | | | |
|---|---|---|---|---|---|---|
| Surface | 21a | 21b | 22a | 22b | 23a | 23b |
| K | 0.00E+00 | 3.09E+00 | −1.06E+01 | 6.79E−01 | −9.90E+01 | −6.62E−01 |
| $A_4$ | −5.22E−02 | −1.20E−01 | −2.80E−01 | −4.52E−01 | −4.45E−02 | −1.62E−02 |
| $A_6$ | 5.39E−02 | 5.08E−01 | 7.00E−01 | 2.07E−01 | −3.45E−01 | 4.18E−01 |
| $A_8$ | −3.12E−01 | −1.13E+00 | −1.46E+00 | −1.18E−01 | 8.05E−01 | −7.62E−02 |
| $A_{10}$ | 3.79E−01 | 9.87E−01 | 1.39E+00 | −5.47E−01 | −1.34E+00 | −5.55E−01 |
| $A_{12}$ | 7.80E−07 | 8.24E−07 | −2.91E−01 | 5.60E−01 | 9.80E−01 | 6.98E−01 |
| $A_{14}$ | 0.00E+00 | 0.00E+00 | 0.00E+00 | 0.00E+00 | 0.00E+00 | −2.71E−01 |
| $A_{16}$ | 0.00E+00 | 0.00E+00 | 0.00E+00 | 0.00E+00 | 0.00E+00 | 0.00E+00 |

| Surface | 24a | 24b | 25a | 25b |
|---|---|---|---|---|
| K | −1.82E+00 | −8.53E−01 | −3.94E+00 | −2.70E+00 |
| $A_4$ | 1.63E−01 | 2.45E−01 | −1.99E−01 | −2.78E−01 |
| $A_6$ | 1.96E−01 | −6.37E−02 | −1.47E−01 | 1.66E−01 |
| $A_8$ | 2.47E−02 | −2.37E−01 | 2.53E−01 | −7.51E−02 |
| $A_{10}$ | −3.26E−01 | 3.96E−01 | −1.92E−01 | 1.87E−02 |
| $A_{12}$ | 2.52E−01 | −2.56E−01 | 7.30E−02 | −1.92E−03 |
| $A_{14}$ | −6.14E−02 | 7.03E−02 | −1.03E−02 | 3.31E−06 |
| $A_{16}$ | 0.00E+00 | 0.00E+00 | 0.00E+00 | 0.00E+00 |

Table 5 lists the corresponding values for the conditions (1) to (8) of the optical imaging lens 20 according to the second embodiment. As shown in Table 5, the optical imaging lens 20 satisfies the conditions (1) to (8).

TABLE 5

| | Second Embodiment | |
|---|---|---|
| No. | Condition | Value |
| 1 | f2*(1/f3 + 1/f4) | −3.09 |
| 2 | dNd1/dT | 2.02E−6 |
| 3 | R4/R5 | 0.01 |
| 4 | (CT3 + CT4)/TTL | 0.29 |
| 5 | AT23/AT34 | 3.50 |
| 6 | |Vd5 − Vd2| | 0.00 |
| 7 | Vd1 | 52.8 |
| 8 | TTL/ImgH | 1.91 |

Referring to FIG. 2B, in order from left to right, which shows longitudinal spherical aberration curves, astigmatic field curves and a distortion curve of the optical imaging lens 20 according to the second embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.02 mm. From the astigmatism field aberration curves at the reference wavelength 588 nm, the aberration of the sagittal curves in the whole field range falls within +0.03 mm; the aberration of the tangential curves in the whole field range falls within +0.06 mm. From the distortion aberration curves, the distortion aberration can be controlled within a range of 5%. Hence, the optical imaging lens 20 of the second embodiment is effectively to reduce aberration and can provide good imaging quality.

Third Embodiment

Figure 3A:
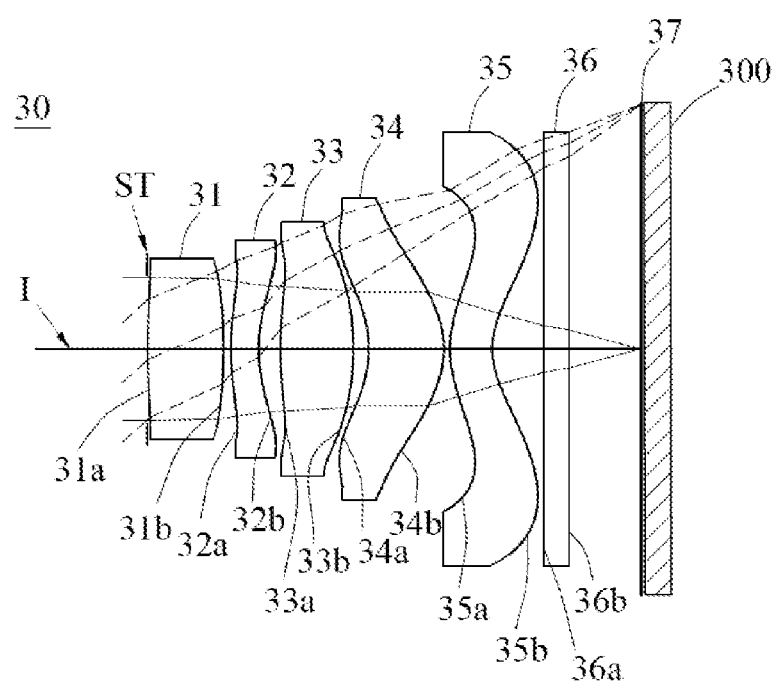
FIG. 3A is a schematic view of an optical imaging lens according to a third embodiment of the present disclosure.
Figure 3B:
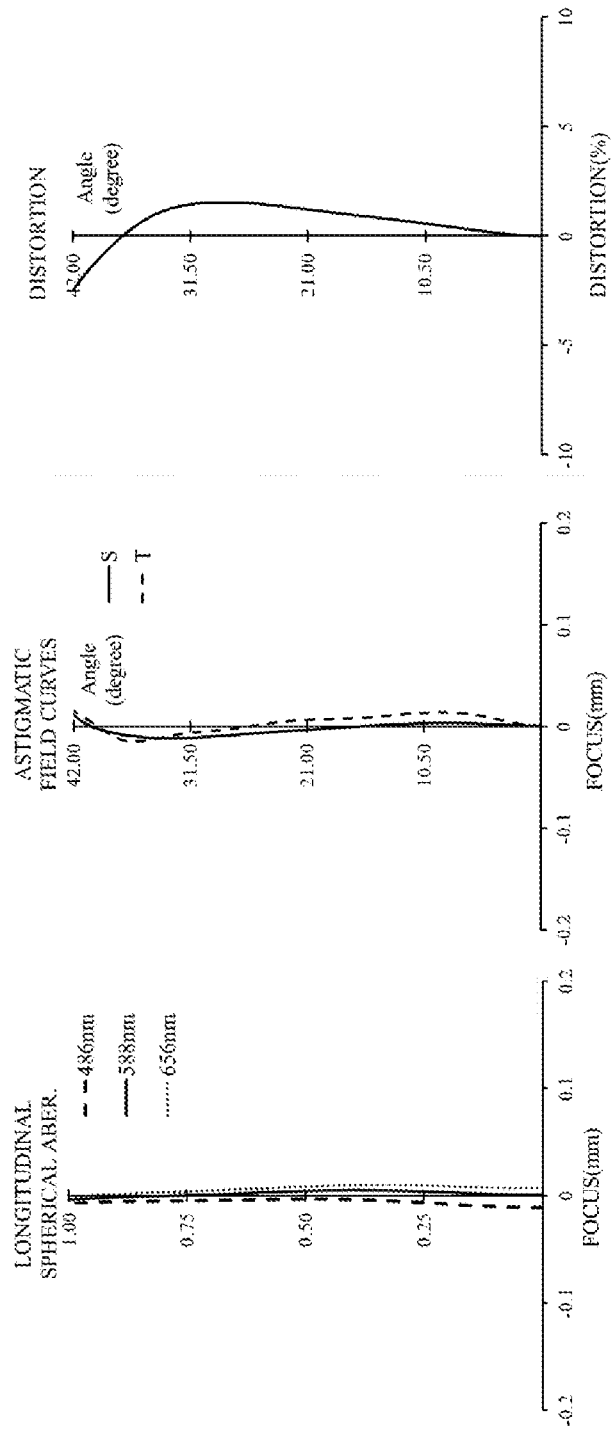
FIG. 3B shows longitudinal spherical aberration curves, astigmatic field curves and a distortion curve of the optical imaging lens according to the third embodiment.

FIG. 3A is a schematic view of an optical imaging lens according to the third embodiment of the present disclosure. FIG. 3B shows, in order from left to right, longitudinal spherical aberration curves, astigmatic field curves and a distortion curve of the optical imaging lens according to the third embodiment.

As shown in FIG. 3A, the optical imaging lens 30 of the third embodiment includes, in order from an object-side to an image side, an aperture ST, a first lens 31, a second lens 32, a third lens 33, a fourth lens 34 and a fifth lens 35. The optical imaging lens 30 can further include a filter element 36 and an image plane 37. An image sensor 300 can be disposed on the image plane 37 to form an imaging device (not labeled).

The first lens 31 has positive refractive power and includes an object-side surface 31a being convex and an image-side surface 31b being convex, wherein both of the object-side surface 31a and the image-side surface 31b of the first lens 31 are formed as aspheric surfaces. The first lens 31 is made of glass material.

The second lens 32 has negative refractive power and includes an object-side surface 32a being convex and an image-side surface 32b being concave, wherein both of the object-side surface 32a and the image-side surface 32b of the second lens 32 are formed as aspheric surfaces. More detail, the object-side surface 32a of the second lens 32 is convex in a paraxial region thereof, while an off-axis region of the object-side surface 32a is concave. The second lens 32 is made of plastic material.

The third lens 33 has positive refractive power and includes an object-side surface 33a being convex and an image-side surface 33b being convex, wherein both of the object-side surface 33a and the image-side surface 33b of the third lens 33 are formed as aspheric surfaces. More detail, the object-side surface 33a of the third lens 33 is convex in a paraxial region thereof, while an off-axis region of the object-side surface 33a is concave; the image-side surface 33b of the third lens 33 is convex in both of a paraxial region and an off-axis region thereof. The third lens 33 is made of plastic material.

The fourth lens 34 has positive refractive power and includes an object-side surface 34a being concave and an image-side surface 34b being convex, wherein both of the object-side surface 34a and the image-side surface 34b of the fourth lens 34 are formed as aspheric surfaces. More detail, the object-side surface 34a of the fourth lens 34 is concave in a paraxial region thereof, while an off-axis region of the object-side surface 34a is convex. The fourth lens 34 is made of plastic material.

The fifth lens 35 has negative refractive power and includes an object-side surface 35a being convex and an image-side surface 35b being concave, wherein both of the object-side surface 35a and the image-side surface 35b of the fifth lens 35 are formed as aspheric surfaces. More detail, the object-side surface 35a of the fifth lens 35 is convex in a paraxial region thereof, while an off-axis region of the object-side surface 35a is concave; the image-side surface 35b of the fifth lens 35 is concave in a paraxial region thereof, while an off-axis region of the image-side surface 35b is convex, wherein each of the object-side surface 35a and the image-side surface 35b includes two inflection points which are symmetrical to the optical axis I. The fifth lens 35 is made of plastic material.

The filter element 36 is disposed between the fifth lens 35 and the image plane 37, and adapted to filter out light of predetermined wavelengths. For example, the filter element 36 can be an IR-cut filter for filtering out infrared light. Both surfaces 36a, 36b of the filter element 36 are flat surfaces. The filter element 36 is made of glass material.

The image sensor 300 can be a CCD (Charge-Coupled Device) image sensor or a CMOS (Complementary Metal-Oxide-Semiconductor) image sensor, for example.

Referring to Table 6 and Table 7, wherein Table 6 shows the optical parameters of the optical imaging lens 30 according to the third embodiment of the present disclosure; Table 7 lists the values of the aspheric coefficients for each of the aspheric surfaces indicated in Table 6.

TABLE 6

Third embodiment
EFL = 2.31 mm, Fno = 1.95, HFOV = 42 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | Infinite | | | | |
| Aperture | ST | | Infinite | 0.009 | | | | |
| First Lens | 31a | ASP | 6.935 | 0.627 | 1.690 | 52.8 | 4.40 | Glass |
| | 31b | ASP | −5.201 | 0.060 | | | | |
| Second Lens | 32a | ASP | 1.952 | 0.230 | 1.661 | 20.4 | −5.39 | Plastic |
| | 32b | ASP | 1.202 | 0.180 | | | | |
| Third Lens | 33a | ASP | 3.012 | 0.604 | 1.544 | 55.9 | 2.60 | Plastic |
| | 33b | ASP | −2.486 | 0.129 | | | | |
| Fourth Lens | 34a | ASP | −0.967 | 0.618 | 1.544 | 55.9 | 3.92 | Plastic |
| | 34b | ASP | −0.816 | 0.050 | | | | |
| Fifth Lens | 35a | ASP | 0.960 | 0.350 | 1.661 | 20.4 | −4.89 | Plastic |
| | 35b | ASP | 0.633 | 0.423 | | | | |
| Filter element | 36a | Plano | Infinite | 0.210 | | | | Glass |
| | 36b | Plano | Infinite | 0.600 | | | | |
| Image Plane | 37 | Plano | Infinite | | | | | |

Reference Wavelength: 588 nm

TABLE 7

Third embodiment_ Aspheric Coefficients

| Surface | 31a | 31b | 32a | 32b | 33a | 33b |
|---|---|---|---|---|---|---|
| K | 0.00E+00 | 3.68E+01 | −8.42E+00 | 5.64E−01 | 4.17E+00 | 3.44E+00 |
| $A_4$ | −3.29E−02 | −1.27E−01 | −3.17E−01 | −5.06E−01 | −1.40E−01 | −1.92E−01 |
| $A_6$ | 9.54E−03 | 5.13E−01 | 6.51E−01 | 3.63E−01 | −1.79E−02 | 3.81E−01 |
| $A_8$ | −1.49E−01 | −1.18E+00 | −1.24E+00 | −5.01E−01 | −2.56E−01 | −8.05E−02 |
| $A_{10}$ | 1.78E−01 | 1.02E+00 | 6.22E−01 | −5.82E−02 | −1.62E−01 | −5.97E−01 |
| $A_{12}$ | 7.80E−07 | 8.24E−07 | −2.83E−02 | 4.02E−02 | 4.29E−01 | 7.51E−01 |
| $A_{14}$ | 0.00E+00 | 0.00E+00 | 0.00E+00 | 0.00E+00 | 0.00E+00 | −2.41E−01 |
| $A_{16}$ | 0.00E+00 | 0.00E+00 | 0.00E+00 | 0.00E+00 | 0.00E+00 | 0.00E+00 |

| Surface | 34a | 34b | 35a | 35b |
|---|---|---|---|---|
| K | −4.98E−01 | −7.95E−01 | −3.95E+00 | −2.97E+00 |
| $A_4$ | 1.31E−01 | 2.23E−01 | −6.00E−02 | −1.17E−01 |
| $A_6$ | 3.20E−01 | 2.17E−02 | −1.61E−01 | −2.86E−02 |
| $A_8$ | 1.79E−01 | −2.13E−01 | 1.17E−01 | 5.98E−02 |
| $A_{10}$ | −4.18E−01 | 4.26E−01 | −3.08E−02 | −3.41E−02 |
| $A_{12}$ | 1.79E−01 | −3.02E−01 | −4.22E−03 | 8.63E−03 |
| $A_{14}$ | −1.58E−02 | 7.14E−02 | 1.08E−03 | −8.61E−04 |
| $A_{16}$ | 0.00E+00 | 0.00E+00 | 0.00E+00 | 0.00E+00 |

Table 8 lists the corresponding values for the conditions (1) to (8) of the optical imaging lens 30 according to the third embodiment. As shown in Table 8, the optical imaging lens 30 satisfies the conditions (1) to (8).

TABLE 8

| | Third embodiment | |
|---|---|---|
| No. | Condition | Value |
| 1 | f2*(1/f3 + 1/f4) | −3.45 |
| 2 | dNd1/dT | 2.02E−6 |
| 3 | R4/R5 | 0.40 |
| 4 | (CT3 + CT4)/TTL | 0.30 |
| 5 | AT23/AT34 | 1.40 |
| 6 | |Vd5 − Vd2| | 0.00 |
| 7 | Vd1 | 52.8 |
| 8 | TTL/ImgH | 2.01 |

Referring to FIG. 3B, in order from left to right, which shows longitudinal spherical aberration curves, astigmatic field curves and a distortion curve of the optical imaging lens 30 according to the third embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.02 mm. From the astigmatism field aberration curves at the reference wavelength 588 nm, the aberration of the sagittal curves in the whole field range falls within +0.02 mm; the aberration of the tangential curves in the whole field range falls within +0.02 mm. From the distortion aberration curves, the distortion aberration can be controlled within a range of 3%. Hence, the optical imaging lens 30 of the third embodiment is effectively to reduce aberration and can provide good imaging quality.

Fourth Embodiment

Figure 4A:
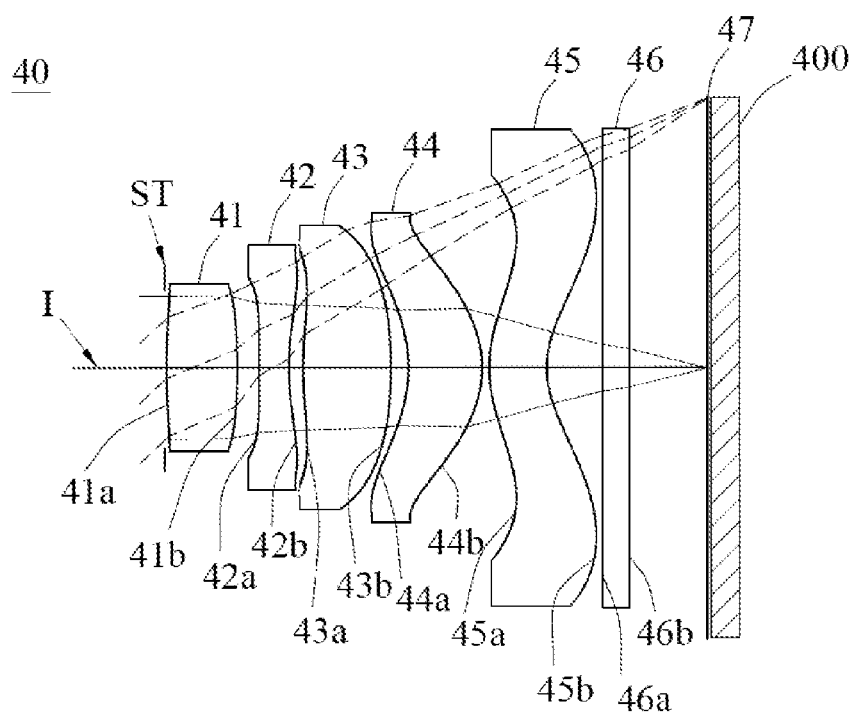
FIG. 4A is a schematic view of an optical imaging lens according to a fourth embodiment of the present disclosure.
Figure 4B:
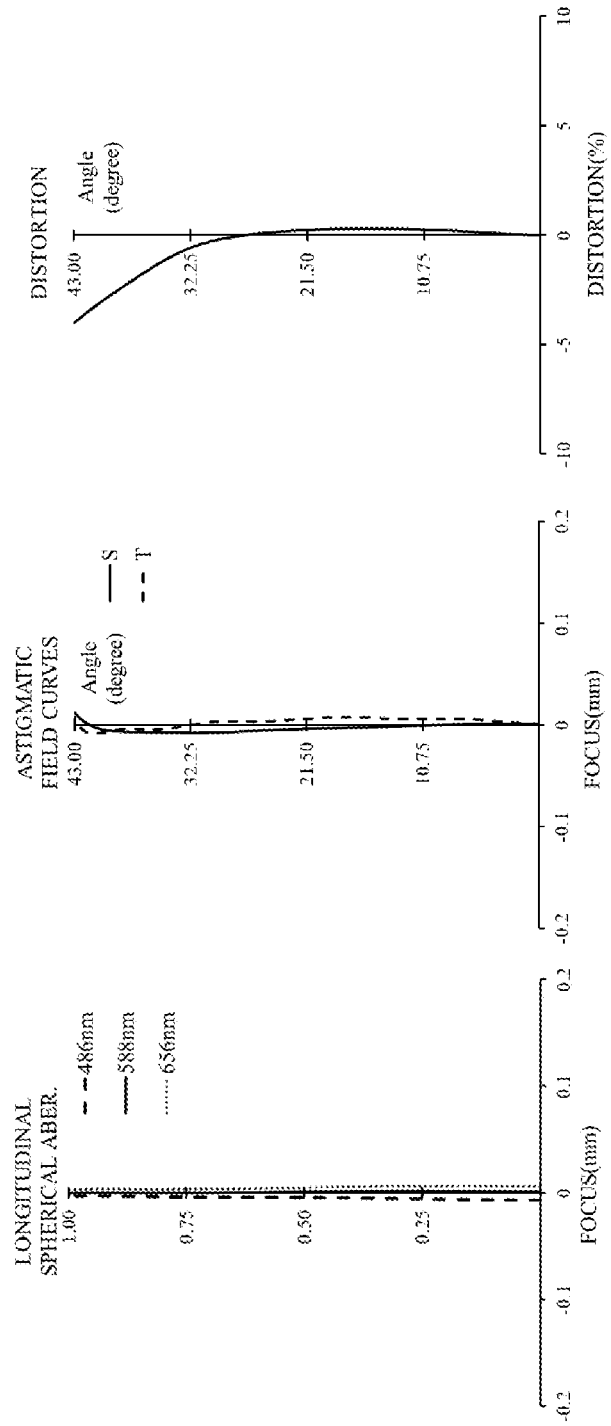
FIG. 4B shows longitudinal spherical aberration curves, astigmatic field curves and a distortion curve of the optical imaging lens according to the fourth embodiment.

FIG. 4A is a schematic view of an optical imaging lens according to the fourth embodiment of the present disclosure. FIG. 4B shows, in order from left to right, longitudinal spherical aberration curves, astigmatic field curves and a distortion curve of the optical imaging lens according to the fourth embodiment.

As shown in FIG. 4A, the optical imaging lens 40 of the fourth embodiment includes, in order from an object-side to an image side, an aperture ST, a first lens 41, a second lens 42, a third lens 43, a fourth lens 44 and a fifth lens 45. The optical imaging lens 40 can further include a filter element 46 and an image plane 47. An image sensor 400 can be disposed on the image plane 47 to form an imaging device (not labeled).

The first lens 41 has positive refractive power and includes an object-side surface 41a being convex and an image-side surface 41b being convex, wherein both of the object-side surface 41a and the image-side surface 41b of the first lens 41 are formed as aspheric surfaces. The first lens 41 is made of glass material.

The second lens 42 has negative refractive power and includes an object-side surface 42a being convex and an image-side surface 42b being concave, wherein both of the object-side surface 42a and the image-side surface 42b of the second lens 42 are formed as aspheric surfaces. More detail, the object-side surface 42a of the second lens 42 is convex in a paraxial region thereof, while an off-axis region of the object-side surface 42a is concave; the image-side surface 42b of the second lens 42 is concave in a paraxial region thereof, while an off-axis region of the image-side surface 42b is convex. The second lens 42 is made of plastic material.

The third lens 43 has positive refractive power and includes an object-side surface 43a being convex and an image-side surface 43b being convex, wherein both of the object-side surface 43a and the image-side surface 43b of the third lens 43 are formed as aspheric surfaces. More detail, the object-side surface 43a of the third lens 43 is convex in a paraxial region thereof, while an off-axis region of the object-side surface 43a is concave; the image-side surface 43b of the third lens 43 is convex in both of a paraxial region and an off-axis region thereof. The third lens 43 is made of plastic material.

The fourth lens 44 has positive refractive power and includes an object-side surface 44a being concave and an image-side surface 44b being convex, wherein both of the object-side surface 44a and the image-side surface 44b of the fourth lens 44 are formed as aspheric surfaces. The fourth lens 44 is made of plastic material.

The fifth lens 45 has negative refractive power and includes an object-side surface 45a being convex and an image-side surface 45b being concave, wherein both of the object-side surface 45a and the image-side surface 45b of the fifth lens 45 are formed as aspheric surfaces. More detail, the object-side surface 45a of the fifth lens 45 is convex in a paraxial region thereof, while an off-axis region of the object-side surface 45a is concave; the image-side surface 45b of the fifth lens 45 is concave in a paraxial region thereof, while an off-axis region of the image-side surface 45b is convex, wherein each of the object-side surface 45a and the image-side surface 45b includes two inflection points which are symmetrical to the optical axis I. The fifth lens 45 is made of plastic material.

The filter element 46 is disposed between the fifth lens 45 and the image plane 47, and adapted to filter out light of predetermined wavelengths. For example, the filter element 46 can be an IR-cut filter for filtering out infrared light. Both surfaces 46a, 46b of the filter element 46 are flat surfaces. The filter element 46 is made of glass material.

The image sensor 400 can be a CCD (Charge-Coupled Device) image sensor or a CMOS (Complementary Metal-Oxide-Semiconductor) image sensor, for example.

Referring to Table 9 and Table 10, wherein Table 9 shows the optical parameters of the optical imaging lens 40 according to the fourth embodiment of the present disclosure; Table 10 lists the values of the aspheric coefficients for each of the aspheric surfaces indicated in Table 9.

TABLE 9

Fourth embodiment
EFL = 2.34 mm, Fno = 2.09, HFOV = 43 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | Infinite | | | | |
| Aperture | ST | | Infinite | 0.009 | | | | |
| First Lens | 41a | ASP | 5.866 | 0.546 | 1.806 | 40.9 | 3.38 | Glass |
| | 41b | ASP | −4.870 | 0.168 | | | | |
| Second Lens | 42a | ASP | 17.114 | 0.230 | 1.661 | 20.4 | −3.12 | Plastic |
| | 42b | ASP | 1.832 | 0.112 | | | | |
| Third Lens | 43a | ASP | 3.012 | 0.680 | 1.544 | 55.9 | 3.07 | Plastic |
| | 43b | ASP | −3.455 | 0.136 | | | | |
| Fourth Lens | 44a | ASP | −1.120 | 0.570 | 1.544 | 55.9 | 3.78 | Plastic |
| | 44b | ASP | −0.856 | 0.050 | | | | |
| Fifth Lens | 45a | ASP | 1.026 | 0.445 | 1.661 | 20.4 | −7.07 | Plastic |
| | 45b | ASP | 0.696 | 0.434 | | | | |
| Filter element | 46a | Plano | Infinite | 0.210 | | | | Glass |
| | 46b | Plano | Infinite | 0.600 | | | | |
| Image Plane | 47 | Plano | Infinite | | | | | |

Reference Wavelength: 588 nm

TABLE 10

Fourth embodiment_ Aspheric Coefficients

| Surface | 41a | 41b | 42a | 42b | 43a | 43b |
|---|---|---|---|---|---|---|
| K | 0.00E+00 | 1.39E+01 | −9.90E+01 | −4.33E−01 | −5.12E +01 | 7.01E+00 |
| $A_4$ | −4.14E−02 | −8.12E−02 | −3.67E−01 | −4.38E−01 | −2.02E−02 | −1.35E−01 |
| $A_6$ | −5.47E−02 | −3.31E−02 | 3.53E−01 | 5.58E−01 | −3.83E−01 | 1.53E−01 |
| $A_8$ | 5.04E−02 | −1.95E−01 | −9.00E−01 | −7.26E−01 | 6.22E−01 | −1.98E−01 |
| $A_{10}$ | −2.34E−01 | −7.15E−03 | 2.28E−01 | 1.97E−01 | −8.22E−01 | 1.31E−01 |
| $A_{12}$ | 2.16E−09 | 1.28E−09 | −2.76E−01 | 1.96E−01 | 4.81E−01 | −4.48E−02 |
| $A_{14}$ | 0.00E+00 | 0.00E+00 | 0.00E+00 | 0.00E+00 | 0.00E+00 | −1.31E−03 |
| $A_{16}$ | 0.00E+00 | 0.00E+00 | 0.00E+00 | 0.00E+00 | 0.00E+00 | 0.00E+00 |

| Surface | 44a | 44b | 45a | 45b |
|---|---|---|---|---|
| K | −7.74E+00 | −1.91E+00 | −7.62E−01 | −2.55E+00 |
| $A_4$ | −3.24E−01 | −1.02E−01 | −4.11E−01 | −2.24E−01 |
| $A_6$ | 4.19E−01 | −9.34E−03 | 1.20E−01 | 1.56E−01 |
| $A_8$ | −5.85E−02 | 1.46E−01 | 3.24E−02 | −8.50E−02 |
| $A_{10}$ | −1.46E−01 | −9.33E−02 | −8.16E−02 | 2.73E−02 |
| $A_{12}$ | 9.49E−02 | 2.89E−02 | 3.99E−02 | −4.60E−03 |
| $A_{14}$ | −1.67E−02 | 6.12E−04 | −6.34E−03 | 3.08E−04 |
| $A_{16}$ | 0.00E+00 | 0.00E+00 | 0.00E+00 | 0.00E+00 |

Table 11 lists the corresponding values for the conditions (1) to (2), and (4) to (8) of the optical imaging lens 40 according to the fourth embodiment. As shown in Table 11, the optical imaging lens 40 satisfies the conditions (1) to (2), and (4) to (8).

TABLE 11

Fourth embodiment

| No. | Condition | Value |
|---|---|---|
| 1 | f2*(1/f3 + 1/f4) | −1.84 |
| 2 | dNd1/dT | 2.02E−6 |
| 4 | (CT3 + CT4)/TTL | 0.30 |
| 5 | AT23/AT34 | 0.82 |
| 6 | |Vd5 − Vd2| | 0.00 |
| 7 | Vd1 | 40.9 |
| 8 | TTL/ImgH | 2.00 |

Referring to FIG. 4B, in order from left to right, which shows longitudinal spherical aberration curves, astigmatic field curves and a distortion curve of the optical imaging lens 40 according to the fourth embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.01 mm. From the astigmatism field aberration curves at the reference wavelength 588 nm, the aberration of the sagittal curves in the whole field range falls within +0.02 mm; the aberration of the tangential curves in the whole field range falls within +0.01 mm. From the distortion aberration curves, the distortion aberration can be controlled within a range of 5%. Hence, the optical imaging lens 40 of the fourth embodiment is effectively to reduce aberration and can provide good imaging quality.

Fifth Embodiment

Figure 5A:
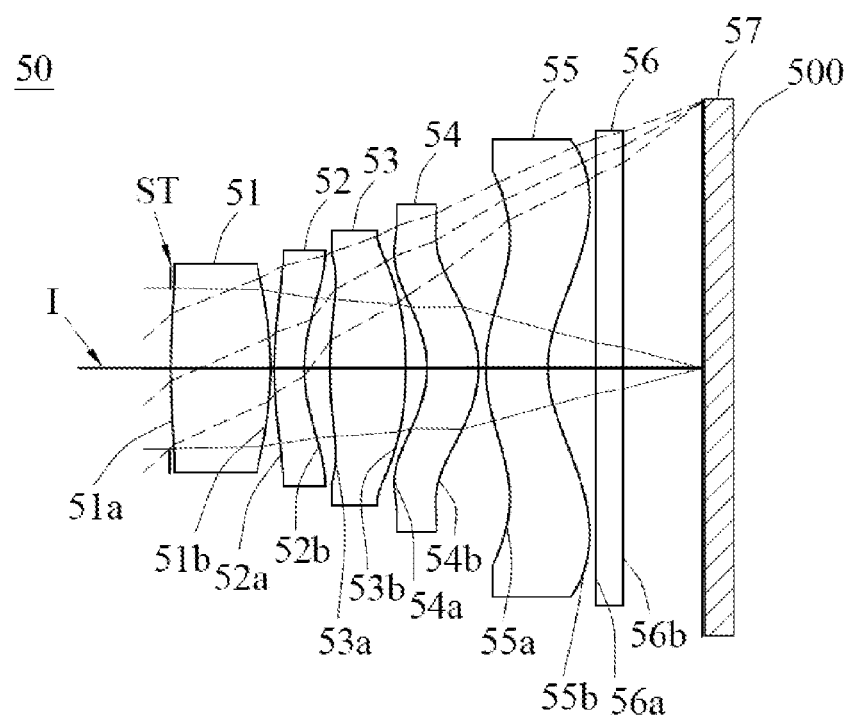
FIG. 5A is a schematic view of an optical imaging lens according to a fifth embodiment of the present disclosure.
Figure 5B:
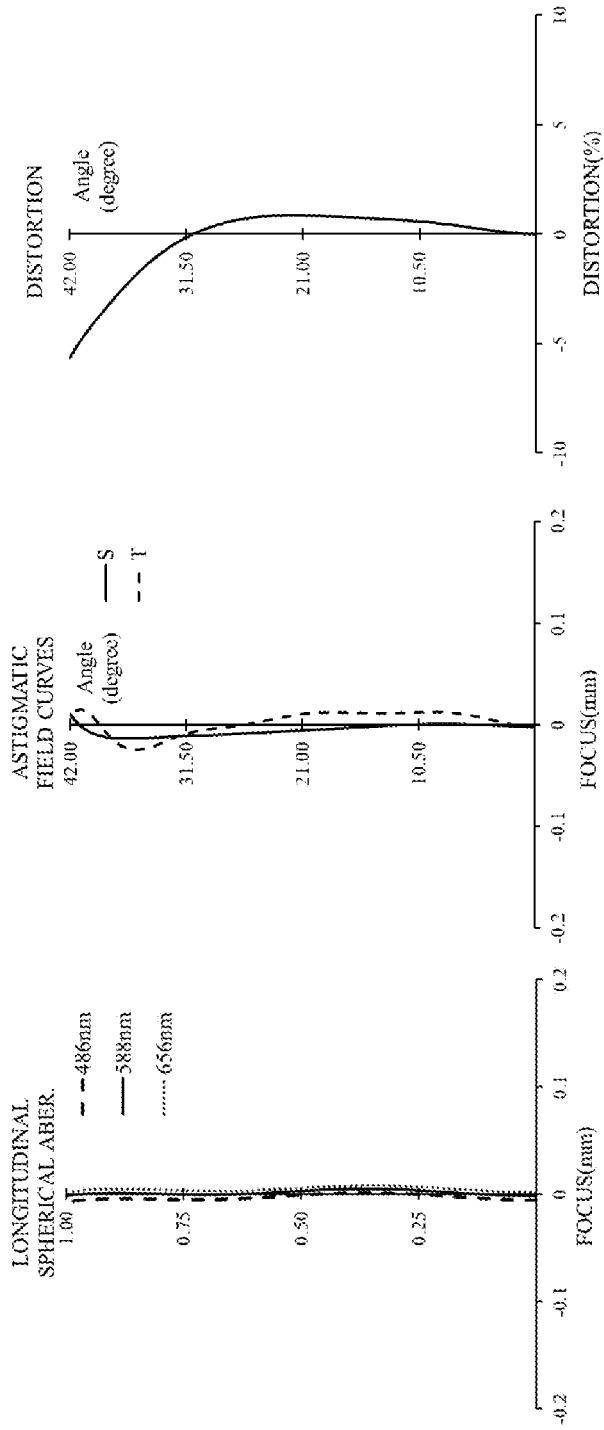
FIG. 5B shows longitudinal spherical aberration curves, astigmatic field curves and a distortion curve of the optical imaging lens according to the fifth embodiment.

FIG. 5A is a schematic view of an optical imaging lens according to the fifth embodiment of the present disclosure. FIG. 5B shows, in order from left to right, longitudinal spherical aberration curves, astigmatic field curves and a distortion curve of the optical imaging lens according to the fifth embodiment.

As shown in FIG. 5A, the optical imaging lens 50 of the fifth embodiment includes, in order from an object-side to an image side, an aperture ST, a first lens 51, a second lens 52, a third lens 53, a fourth lens 54 and a fifth lens 55. The optical imaging lens 50 can further include a filter element 56 and an image plane 57. An image sensor 500 can be disposed on the image plane 57 to form an imaging device (not labeled).

The first lens 51 has positive refractive power and includes an object-side surface 51a being convex and an image-side surface 51b being convex, wherein both of the object-side surface 51a and the image-side surface 51b of the first lens 51 are formed as aspheric surfaces. The first lens 51 is made of glass material.

The second lens 52 has negative refractive power and includes an object-side surface 52a being convex and an image-side surface 52b being concave, wherein both of the object-side surface 52a and the image-side surface 52b of the second lens 52 are formed as aspheric surfaces. The second lens 52 is made of plastic material.

The third lens 53 has positive refractive power and includes an object-side surface 53a being convex and an image-side surface 53b being convex, wherein both of the object-side surface 53a and the image-side surface 53b of the third lens 53 are formed as aspheric surfaces. More detail, the object-side surface 53a of the third lens 53 is convex in a paraxial region thereof, while an off-axis region of the object-side surface 53a is concave; the image-side surface 53b of the third lens 53 is convex in both of a paraxial region and an off-axis region thereof. The third lens 53 is made of plastic material.

The fourth lens 54 has positive refractive power and includes an object-side surface 54a being concave and an image-side surface 54b being convex, wherein both of the object-side surface 54a and the image-side surface 54b of the fourth lens 54 are formed as aspheric surfaces. More detail, the object-side surface 54a of the fourth lens 54 is concave in a paraxial region thereof, while an off-axis region of the object-side surface 54a is convex; the image-side surface 54b of the fourth lens 54 is convex in a paraxial region thereof, while an off-axis region of the image-side surface 54b is concave. The fourth lens 54 is made of plastic material.

The fifth lens 55 has negative refractive power and includes an object-side surface 55a being convex and an image-side surface 55b being concave, wherein both of the object-side surface 55a and the image-side surface 55b of the fifth lens 55 are formed as aspheric surfaces. More detail, the object-side surface 55a of the fifth lens 55 is convex in a paraxial region thereof, while an off-axis region of the object-side surface 55a is concave; the image-side surface 55b of the fifth lens 55 is concave in a paraxial region thereof, while an off-axis region of the image-side surface 55b is convex, wherein each of the object-side surface 55a and the image-side surface 55b includes two inflection points which are symmetrical to the optical axis I. The fifth lens 55 is made of plastic material.

The filter element 56 is disposed between the fifth lens 55 and the image plane 57, and adapted to filter out light of predetermined wavelengths. For example, the filter element 56 can be an IR-cut filter for filtering out infrared light. Both surfaces 56a, 56b of the filter element 56 are flat surfaces. The filter element 56 is made of glass material.

The image sensor 500 can be a CCD (Charge-Coupled Device) image sensor or a CMOS (Complementary Metal-Oxide-Semiconductor) image sensor, for example.

Referring to Table 12 and Table 13, wherein Table 12 shows the optical parameters of the optical imaging lens 50 according to the fifth embodiment of the present disclosure; Table 13 lists the values of the aspheric coefficients for each of the aspheric surfaces indicated in Table 12.

TABLE 12

Fifth embodiment
EFL = 2.39 mm, Fno = 1.96, HFOV = 42 deg

|  | Surface | Surface Type | Curvature Radius (mm) | Distance (mm) | Refractive Index | Abbe Number | Focal Length (mm) | Material |
|---|---|---|---|---|---|---|---|---|
| Object |  |  | Infinite | Infinite |  |  |  |  |
| Aperture | ST |  | Infinite | 0.007 |  |  |  |  |
| First | 51a | ASP | 6.182 | 0.761 | 1.690 | 52.8 | 2.79 | Glass |
| Lens | 51b | ASP | −2.649 | 0.030 |  |  |  |  |
| Second | 52a | ASP | 2.795 | 0.230 | 1.661 | 20.4 | −3.33 | Plastic |
| Lens | 52b | ASP | 1.192 | 0.195 |  |  |  |  |
| Third | 53a | ASP | 3.119 | 0.580 | 1.544 | 55.9 | 2.86 | Plastic |
| Lens | 53b | ASP | −2.901 | 0.163 |  |  |  |  |
| Fourth | 54a | ASP | −0.766 | 0.394 | 1.544 | 55.9 | 10.39 | Plastic |
| Lens | 54b | ASP | −0.797 | 0.050 |  |  |  |  |
| Fifth | 55a | ASP | 1.167 | 0.475 | 1.661 | 20.4 | −12.12 | Plastic |
| Lens | 55b | ASP | 0.854 | 0.370 |  |  |  |  |
| Filter | 56a | Plano | Infinite | 0.210 |  |  |  | Glass |
| element | 56b | Plano | Infinite | 0.600 |  |  |  |  |
| Image Plane | 57 | Plano | Infinite |  |  |  |  |  |

Reference Wavelength: 588 nm

TABLE 13

Fifth embodiment_ Aspheric Coefficients

| Surface | 51a | 51b | 52a | 52b | 53a | 53b |
|---|---|---|---|---|---|---|
| K | 0.00E+00 | −3.02E+01 | 1.09E+00 | 5.44E−01 | −5.87E+01 | 6.27E+00 |
| $A_4$ | −5.18E−02 | −1.26E−01 | −2.79E−01 | −5.77E−01 | 1.56E−01 | −1.18E−01 |
| $A_6$ | 2.36E−02 | 3.30E−01 | 7.38E−01 | 7.63E−01 | −6.17E−01 | 2.14E−01 |
| $A_8$ | −1.61E−01 | −7.85E−01 | −1.57E+00 | −1.34E+00 | 1.00E+00 | −1.43E−01 |
| $A_{10}$ | 2.04E−01 | 7.16E−01 | 1.48E+00 | 8.41E−01 | −1.66E+00 | −9.22E−02 |
| $A_{12}$ | −1.18E−06 | −2.24E−03 | −4.19E−01 | −3.12E−01 | 1.10E+00 | 1.71E−01 |
| $A_{14}$ | 0.00E+00 | 0.00E+00 | 0.00E+00 | 0.00E+00 | 0.00E+00 | 3.06E−03 |
| $A_{16}$ | 0.00E+00 | 0.00E+00 | 0.00E+00 | 0.00E+00 | 0.00E+00 | 0.00E+00 |

| Surface | 54a | 54b | 55a | 55b |
|---|---|---|---|---|
| K | −3.55E+00 | −2.42E+00 | −6.00E−01 | −3.77E+00 |
| $A_4$ | −2.23E−01 | −3.67E−02 | −3.33E−01 | −6.74E−02 |
| $A_6$ | 6.69E−01 | 7.95E−02 | 5.12E−02 | −4.91E−02 |
| $A_8$ | −1.64E−01 | 2.15E−01 | 2.05E−02 | 6.06E−02 |
| $A_{10}$ | −2.59E−01 | −8.42E−02 | −3.10E−02 | −3.12E−02 |
| $A_{12}$ | 1.67E−01 | −9.77E−02 | 1.59E−02 | 7.91E−03 |
| $A_{14}$ | −3.62E−02 | 4.45E−02 | −2.93E−03 | −8.04E−04 |
| $A_{16}$ | 0.00E+00 | 0.00E+00 | 0.00E+00 | 0.00E+00 |

Table 14 lists the corresponding values for the conditions (1) to (8) of the optical imaging lens 50 according to the fifth embodiment. As shown in Table 14, the optical imaging lens 50 satisfies the conditions (1) to (8).

TABLE 14

Fifth embodiment

| No. | Condition | Value |
|---|---|---|
| 1 | f2*(1/f3 + 1/f4) | −1.49 |
| 2 | dNd1/dT | 2.02E−6 |
| 3 | R4/R5 | 0.38 |
| 4 | (CT3 + CT4)/TTL | 0.24 |
| 5 | AT23/AT34 | 1.20 |
| 6 | |Vd5 − Vd2| | 0.00 |
| 7 | Vd1 | 52.8 |
| 8 | TTL/ImgH | 1.99 |

Referring to FIG. 5B, in order from left to right, which shows longitudinal spherical aberration curves, astigmatic field curves and a distortion curve of the optical imaging lens 50 according to the fifth embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.01 mm. From the astigmatism field aberration curves at the reference wavelength 588 nm, the aberration of the sagittal curves in the whole field range falls within ±0.02 mm; the aberration of the tangential curves in the whole field range falls within +0.03 mm. From the distortion aberration curves, the distortion aberration can be controlled within a range of 6%. Hence, the optical imaging lens 50 of the fifth embodiment is effectively to reduce aberration and can provide good imaging quality.

Sixth Embodiment

Figure 6A:
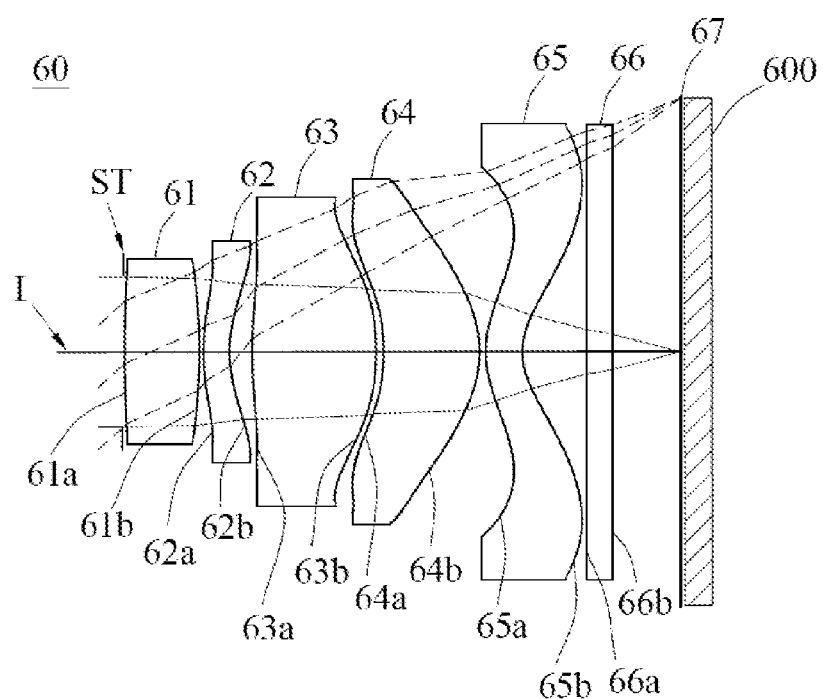
FIG. 6A is a schematic view of an optical imaging lens according to a sixth embodiment of the present disclosure.
Figure 6B:
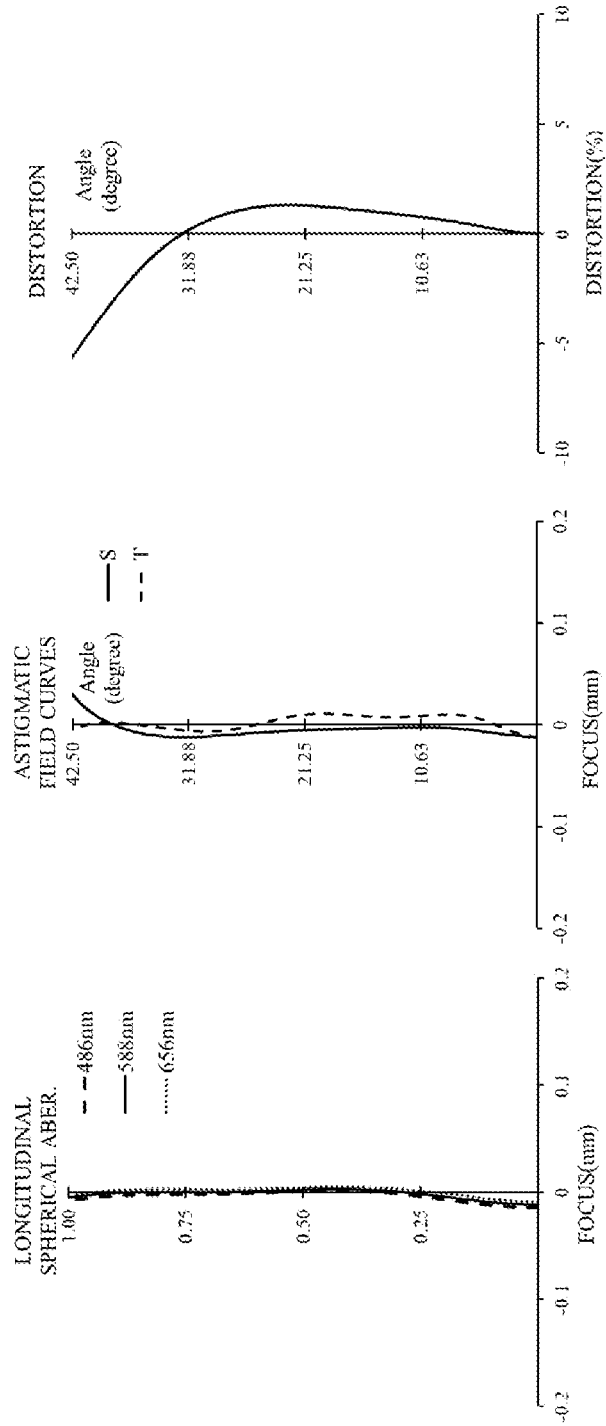
FIG. 6B shows longitudinal spherical aberration curves, astigmatic field curves and a distortion curve of the optical imaging lens according to the sixth embodiment.

FIG. 6A is a schematic view of an optical imaging lens according to the sixth embodiment of the present disclosure. FIG. 6B shows, in order from left to right, longitudinal spherical aberration curves, astigmatic field curves and a distortion curve of the optical imaging lens according to the sixth embodiment.

As shown in FIG. 6A, the optical imaging lens 60 of the sixth embodiment includes, in order from an object-side to an image side, an aperture ST, a first lens 61, a second lens 62, a third lens 63, a fourth lens 64 and a fifth lens 65. The optical imaging lens 60 can further include a filter element 66 and an image plane 67. An image sensor 600 can be disposed on the image plane 67 to form an imaging device (not labeled).

The first lens 61 has positive refractive power and includes an object-side surface 61a being convex and an image-side surface 61b being convex, wherein both of the object-side surface 61a and the image-side surface 61b of the first lens 61 are formed as aspheric surfaces. The first lens 61 is made of glass material.

The second lens 62 has negative refractive power and includes an object-side surface 62a being convex and an image-side surface 62b being concave, wherein both of the object-side surface 62a and the image-side surface 62b of the second lens 62 are formed as aspheric surfaces. More detail, the object-side surface 62a of the second lens 62 is convex in a paraxial region thereof, while an off-axis region of the object-side surface 62a is concave. The second lens 62 is made of plastic material.

The third lens 63 has positive refractive power and includes an object-side surface 63a being convex and an image-side surface 63b being convex, wherein both of the object-side surface 63a and the image-side surface 63b of the third lens 63 are formed as aspheric surfaces. More detail, the object-side surface 63a of the third lens 63 is convex in a paraxial region thereof, while an off-axis region of the object-side surface 63a is concave; the image-side surface 63b of the third lens 63 is convex in both of a paraxial region and an off-axis region thereof. The third lens 63 is made of plastic material.

The fourth lens 64 has positive refractive power and includes an object-side surface 64a being concave and an image-side surface 64b being convex, wherein both of the object-side surface 64a and the image-side surface 64b of the fourth lens 64 are formed as aspheric surfaces. More detail, the object-side surface 64a of the fourth lens 64 is concave in a paraxial region thereof, while an off-axis region of the object-side surface 64a is convex. The fourth lens 64 is made of plastic material.

The fifth lens 65 has negative refractive power and includes an object-side surface 65a being convex and an image-side surface 65b being concave, wherein both of the object-side surface 65a and the image-side surface 65b of the fifth lens 65 are formed as aspheric surfaces. More detail, the object-side surface 65a of the fifth lens 65 is convex in a paraxial region thereof, while an off-axis region of the object-side surface 65a is concave; the image-side surface 65b of the fifth lens 65 is concave in a paraxial region thereof, while an off-axis region of the image-side surface 65b is convex, wherein each of the object-side surface 65a and the image-side surface 65b includes two inflection points which are symmetrical to the optical axis I. The fifth lens 65 is made of plastic material.

The filter element 66 is disposed between the fifth lens 65 and the image plane 67, and adapted to filter out light of predetermined wavelengths. For example, the filter element 66 can be an IR-cut filter for filtering out infrared light. Both surfaces 66a, 66b of the filter element 66 are flat surfaces. The filter element 66 is made of glass material.

The image sensor 600 can be a CCD (Charge-Coupled Device) image sensor or a CMOS (Complementary Metal-Oxide-Semiconductor) image sensor, for example.

Referring to Table 15 and Table 16, wherein Table 15 shows the optical parameters of the optical imaging lens 60 according to the sixth embodiment of the present disclosure; Table 16 lists the values of the aspheric coefficients for each of the aspheric surfaces indicated in Table 15.

TABLE 15

Sixth embodiment
EFL = 2.37 mm, Fno = 1.96, HFOV = 42.5 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | Infinite | | | | |
| Aperture | ST | | Infinite | 0.013 | | | | |
| First Lens | 61a | ASP | 11.196 | 0.605 | 1.690 | 52.8 | 4.34 | Glass |
| | 61b | ASP | −3.994 | 0.032 | | | | |
| Second Lens | 62a | ASP | 1.726 | 0.210 | 1.661 | 20.4 | −4.28 | Plastic |
| | 62b | ASP | 1.021 | 0.184 | | | | |
| Third Lens | 63a | ASP | 3.728 | 1.003 | 1.544 | 55.9 | 2.61 | Plastic |
| | 63b | ASP | −2.081 | 0.063 | | | | |
| Fourth Lens | 64a | ASP | −1.598 | 0.770 | 1.544 | 55.9 | 2.98 | Plastic |
| | 64b | ASP | −0.942 | 0.050 | | | | |
| Fifth Lens | 65a | ASP | 0.843 | 0.297 | 1.661 | 20.4 | −3.33 | Plastic |
| | 65b | ASP | 0.524 | 0.522 | | | | |
| Filter element | 66a | Plano | Infinite | 0.210 | | | | Glass |
| | 66b | Plano | Infinite | 0.550 | | | | |
| Image Plane | 67 | Plano | Infinite | | | | | |

Reference Wavelength: 588 nm

TABLE 16

Sixth embodiment_ Aspheric Coefficients

| Surface | 61a | 61b | 62a | 62b | 63a | 63b |
|---|---|---|---|---|---|---|
| K | 0.00E+00 | −9.13E+01 | −4.28E+00 | 3.67E−02 | −9.90E+01 | 1.49E+00 |
| $A_4$ | 5.85E−03 | −8.84E−02 | −3.27E−01 | −7.25E−01 | 1.37E−01 | −3.23E−01 |
| $A_6$ | 9.44E−03 | 4.11E−01 | 7.39E−01 | 9.27E−01 | −6.09E−01 | 5.08E−01 |
| $A_8$ | −1.20E−01 | −1.01E+00 | −1.43E+00 | −1.48E+00 | 1.06E+00 | −1.45E−01 |
| $A_{10}$ | 1.56E−01 | 7.62E−01 | 9.75E−01 | 9.59E−01 | −1.16E+00 | −1.59E−01 |
| $A_{12}$ | 8.15E−07 | 1.19E−06 | −3.15E−01 | −3.58E−01 | 5.51E−01 | 1.48E−01 |
| $A_{14}$ | 0.00E+00 | 0.00E+00 | 0.00E+00 | 0.00E+00 | 0.00E+00 | −3.13E−02 |
| $A_{16}$ | 0.00E+00 | 0.00E+00 | 0.00E+00 | 0.00E+00 | 0.00E+00 | 0.00E+00 |

| Surface | 64a | 64b | 65a | 65b |
|---|---|---|---|---|
| K | −6.53E+00 | −1.41E+00 | −3.01E+00 | −2.24E+00 |
| $A_4$ | −4.18E−01 | 1.05E−01 | −1.77E−01 | −2.37E−01 |
| $A_6$ | 6.00E−01 | −1.13E−01 | −3.45E−02 | 1.15E−01 |
| $A_8$ | −1.07E−01 | 6.94E−02 | 5.03E−02 | −3.29E−02 |
| $A_{10}$ | −2.22E−01 | −1.08E−02 | −7.21E−03 | 3.59E−03 |
| $A_{12}$ | 1.55E−01 | 1.35E−03 | −7.61E−03 | 1.74E−04 |
| $A_{14}$ | −3.33E−02 | −1.72E−03 | 2.24E−03 | −4.03E−05 |
| $A_{16}$ | 0.00E+00 | 0.00E+00 | 0.00E+00 | 0.00E+00 |

Table 17 lists the corresponding values for the conditions (1) to (8) of the optical imaging lens 60 according to the sixth embodiment. As shown in Table 20, the optical imaging lens 60 satisfies the conditions (1) to (8).

TABLE 17

| | Sixth embodiment | |
|---|---|---|
| No. | Condition | Value |
| 1 | f2*(1/f3 + 1/f4) | −3.08 |
| 2 | dNd1/dT | 2.02E−6 |
| 3 | R4/R5 | 0.27 |
| 4 | (CT3 + CT4)/TTL | 0.39 |
| 5 | AT23/AT34 | 2.92 |
| 6 | |Vd5 − Vd2| | 0.00 |
| 7 | Vd1 | 52.8 |
| 8 | TTL/ImgH | 2.18 |

Referring to FIG. 6B, in order from left to right, which shows longitudinal spherical aberration curves, astigmatic field curves and a distortion curve of the optical imaging lens 60 according to the sixth embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.02 mm. From the astigmatism field aberration curves at the reference wavelength 588 nm, the aberration of the sagittal curves in the whole field range falls within +0.03 mm; the aberration of the tangential curves in the whole field range falls within +0.02 mm. From the distortion aberration curves, the distortion aberration can be controlled within a range of 6%. Hence, the optical imaging lens 60 of the sixth embodiment is effectively to reduce aberration and can provide good imaging quality.

Seventh Embodiment

Figure 7A:
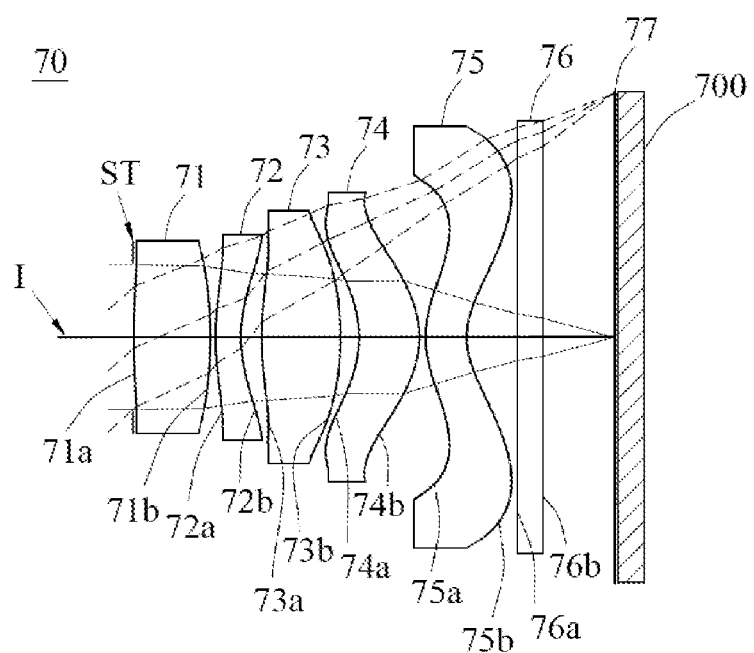
FIG. 7A is a schematic view of an optical imaging lens according to a seventh embodiment of the present disclosure.
Figure 7B:
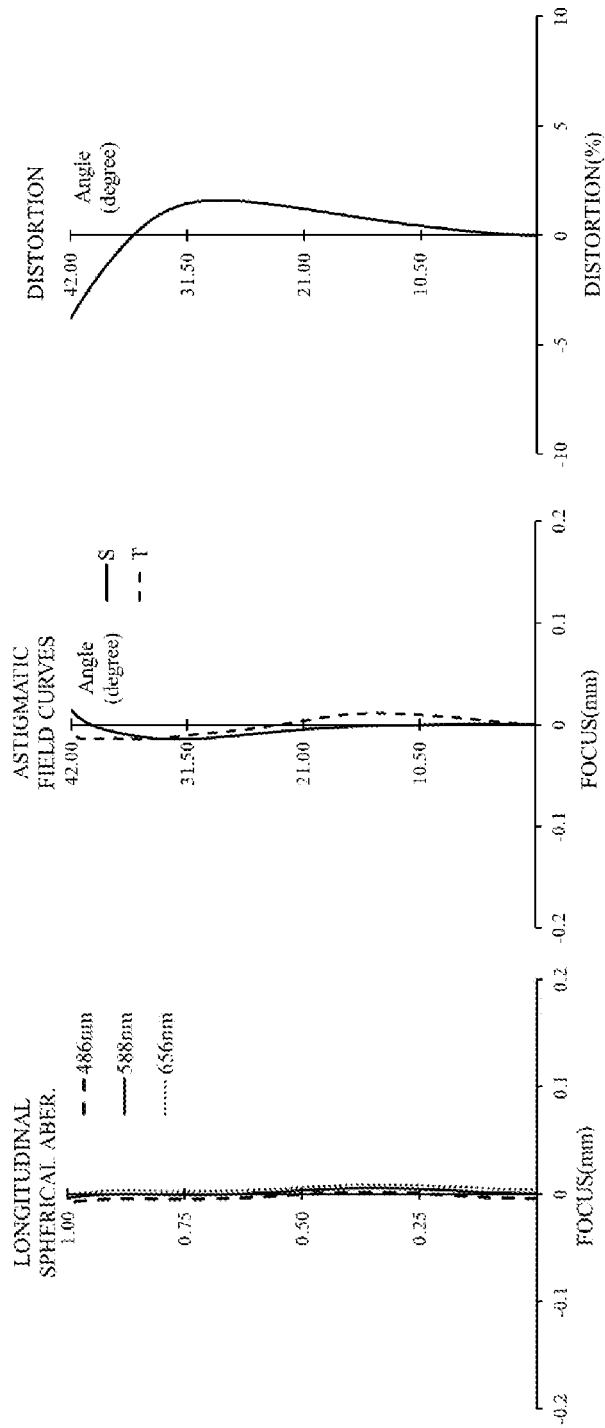
FIG. 7B shows longitudinal spherical aberration curves, astigmatic field curves and a distortion curve of the optical imaging lens according to the seventh embodiment.

FIG. 7A is a schematic view of an optical imaging lens according to the seventh embodiment of the present disclosure. FIG. 7B shows, in order from left to right, longitudinal spherical aberration curves, astigmatic field curves and a distortion curve of the optical imaging lens according to the seventh embodiment.

As shown in FIG. 7A, the optical imaging lens 70 of the seventh embodiment includes, in order from an object-side to an image side, an aperture ST, a first lens 71, a second lens 72, a third lens 73, a fourth lens 74 and a fifth lens 75. The optical imaging lens 70 can further include a filter element 76 and an image plane 77. An image sensor 700 can be disposed on the image plane 77 to form an imaging device (not labeled).

The first lens 71 has positive refractive power and includes an object-side surface 71a being convex and an image-side surface 71b being convex, wherein both of the object-side surface 71a and the image-side surface 71b of the first lens 71 are formed as aspheric surfaces. The first lens 71 is made of glass material.

The second lens 72 has negative refractive power and includes an object-side surface 72a being convex and an image-side surface 72b being concave, wherein both of the object-side surface 72a and the image-side surface 72b of the second lens 72 are formed as aspheric surfaces. More detail, the object-side surface 72a of the second lens 72 is convex in a paraxial region thereof, while an off-axis region of the object-side surface 72a is concave. The second lens 72 is made of plastic material.

The third lens 73 has positive refractive power and includes an object-side surface 73a being convex and an image-side surface 73b being convex, wherein both of the object-side surface 73a and the image-side surface 73b of the third lens 73 are formed as aspheric surfaces. More detail, the object-side surface 73a of the third lens 73 is convex in a paraxial region thereof, while an off-axis region of the object-side surface 73a is concave; the image-side surface 73b of the third lens 73 is convex in both of a paraxial region and an off-axis region thereof. The third lens 73 is made of plastic material.

The fourth lens 74 has positive refractive power and includes an object-side surface 74a being concave and an image-side surface 74b being convex, wherein both of the object-side surface 74a and the image-side surface 74b of the fourth lens 74 are formed as aspheric surfaces. More detail, the object-side surface 74a of the fourth lens 74 is concave in a paraxial region thereof, while an off-axis region of the object-side surface 74a is convex; the image-side surface 74b of the fourth lens 74 is convex in a paraxial region thereof, while an off-axis region of the image-side surface 74b is concave. The fourth lens 74 is made of plastic material.

The fifth lens 75 has negative refractive power and includes an object-side surface 75a being convex and an image-side surface 75b being concave, wherein both of the object-side surface 75a and the image-side surface 75b of the fifth lens 75 are formed as aspheric surfaces. More detail, the object-side surface 75a of the fifth lens 75 is convex in a paraxial region thereof, while an off-axis region of the object-side surface 75a is concave; the image-side surface 75b of the fifth lens 75 is concave in a paraxial region thereof, while an off-axis region of the image-side surface 75b is convex, wherein each of the object-side surface 75a and the image-side surface 75b includes two inflection points which are symmetrical to the optical axis I. The fifth lens 75 is made of plastic material.

The filter element 76 is disposed between the fifth lens 75 and the image plane 77, and adapted to filter out light of predetermined wavelengths. For example, the filter element 76 can be an IR-cut filter for filtering out infrared light. Both surfaces 76a, 76b of the filter element 76 are flat surfaces. The filter element 76 is made of glass material.

The image sensor 700 can be a CCD (Charge-Coupled Device) image sensor or a CMOS (Complementary Metal-Oxide-Semiconductor) image sensor, for example.

Referring to Table 18 and Table 19, wherein Table 18 shows the optical parameters of the optical imaging lens 70 according to the seventh embodiment of the present disclosure; Table 19 lists the values of the aspheric coefficients for each of the aspheric surfaces indicated in Table 18.

TABLE 18

Seventh embodiment
EFL = 2.35 mm, Fno = 1.95, HFOV = 42 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | Infinite | | | | |
| Aperture | ST | | Infinite | 0.008 | | | | |
| First Lens | 71a | ASP | 6.474 | 0.635 | 1.690 | 52.8 | 3.38 | Glass |
| | 71b | ASP | −3.497 | 0.043 | | | | |
| Second Lens | 72a | ASP | 2.124 | 0.210 | 1.661 | 20.4 | −3.79 | Plastic |
| | 72b | ASP | 1.105 | 0.173 | | | | |
| Third Lens | 73a | ASP | 2.764 | 0.652 | 1.544 | 55.9 | 2.69 | Plastic |
| | 73b | ASP | −2.859 | 0.156 | | | | |
| Fourth Lens | 74a | ASP | −0.909 | 0.502 | 1.544 | 55.9 | 4.24 | Plastic |
| | 74b | ASP | −0.779 | 0.050 | | | | |
| Fifth Lens | 75a | ASP | 0.876 | 0.335 | 1.584 | 30.4 | −5.20 | Plastic |
| | 75b | ASP | 0.584 | 0.422 | | | | |
| Filter element | 76a | Plano | Infinite | 0.210 | | | | Glass |
| | 76b | Plano | Infinite | 0.600 | | | | |
| Image Plane | 77 | Plano | Infinite | | | | | |

Reference Wavelength: 588 nm

TABLE 19

Seventh embodiment_ Aspheric Coefficients

| Surface | 71a | 71b | 72a | 72b | 73a | 73b |
|---|---|---|---|---|---|---|
| K | 0.00E+00 | −1.22E+01 | −7.63E+00 | 3.14E−01 | −5.39E+01 | 3.80E+00 |
| $A_4$ | −4.22E−02 | −4.44E−02 | −3.05E−01 | −6.54E−01 | 1.78E−01 | −1.48E−01 |
| $A_6$ | 1.98E−02 | 1.77E−01 | 8.16E−01 | 8.90E−01 | −6.73E−01 | 1.82E−01 |
| $A_8$ | −1.85E−01 | −6.77E−01 | −1.67E+00 | −1.51E+00 | 1.15E+00 | −7.80E−02 |
| $A_{10}$ | 2.29E−01 | 6.36E−01 | 1.32E+00 | 1.07E+00 | −1.55E+00 | −9.48E−02 |
| $A_{12}$ | 7.80E−07 | 8.24E−07 | −3.15E−01 | −4.34E−01 | 9.10E−01 | 1.36E−01 |
| $A_{14}$ | 0.00E+00 | 0.00E+00 | 0.00E+00 | 0.00E+00 | 0.00E+00 | −2.83E−02 |
| $A_{16}$ | 0.00E+00 | 0.00E+00 | 0.00E+00 | 0.00E+00 | 0.00E+00 | 0.00E+00 |

| Surface | 74a | 74b | 75a | 75b |
|---|---|---|---|---|
| K | −5.50E+00 | −2.51E+00 | −1.13E+00 | −2.89E+00 |
| $A_4$ | −4.38E−01 | −1.27E−01 | −5.86E−01 | −1.78E−01 |
| $A_6$ | 6.97E−01 | 4.54E−02 | 4.43E−01 | 5.25E−02 |
| $A_8$ | −6.72E−02 | 1.85E−01 | −3.98E−01 | 6.53E−03 |
| $A_{10}$ | −2.62E−01 | −5.22E−02 | 2.79E−01 | −1.59E−02 |
| $A_{12}$ | 1.20E−01 | −7.01E−02 | −1.24E−01 | 5.51E−03 |
| $A_{14}$ | −1.22E−02 | 3.26E−02 | 2.28E−02 | −6.64E−04 |
| $A_{16}$ | 0.00E+00 | 0.00E+00 | 0.00E+00 | 0.00E+00 |

Table 20 lists the corresponding values for the conditions (1) to (8) of the optical imaging lens 70 according to the seventh embodiment. As shown in Table 20, the optical imaging lens 70 satisfies the conditions (1) to (8).

TABLE 20

Seventh embodiment

| No. | Condition | Value |
|---|---|---|
| 1 | f2*(1/f3 + 1/f4) | −2.30 |
| 2 | dNd1/dT | 2.02E−6 |
| 3 | R4/R5 | 0.40 |
| 4 | (CT3 + CT4)/TTL | 0.29 |
| 5 | AT23/AT34 | 1.11 |
| 6 | |Vd5 − Vd2| | 10.00 |
| 7 | Vd1 | 52.8 |
| 8 | TTL/ImgH | 1.96 |

Referring to FIG. 7B, in order from left to right, which shows longitudinal spherical aberration curves, astigmatic field curves and a distortion curve of the optical imaging lens 70 according to the seventh embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.01 mm. From the astigmatism field aberration curves at the reference wavelength 588 nm, the aberration of the sagittal curves in the whole field range falls within ±0.02 mm; the aberration of the tangential curves in the whole field range falls within +0.02 mm. From the distortion aberration curves, the distortion aberration can be controlled within a range of 4%. Hence, the optical imaging lens 70 of the seventh embodiment is effectively to reduce aberration and can provide good imaging quality.

Eighth Embodiment

According to an eighth embodiment of the present disclosure, an imaging device includes an optical imaging lens of the first to the seventh embodiments and an image sensor, wherein the image sensor is disposed on an image plane of the optical imaging lens. The image sensor could be a CCD (Charge-Coupled Device) image sensor or a CMOS (Complementary Metal-Oxide-Semiconductor) image sensor, etc.

Ninth Embodiment

Figure 8:
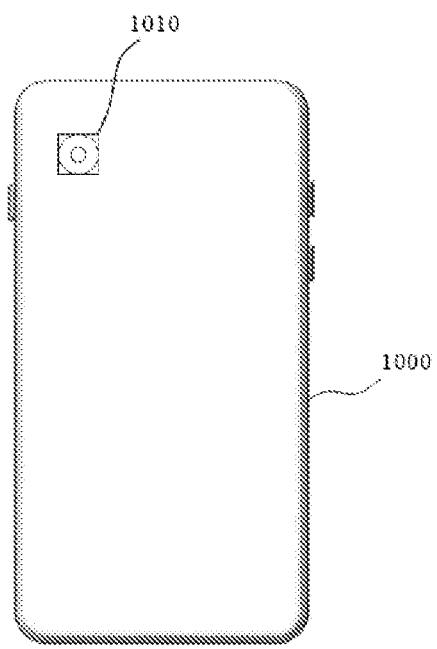
FIG. 8 is a schematic view of an electronic device according to the ninth embodiment of the present disclosure.

FIG. 8 is a schematic view of an electronic device according to a ninth embodiment of the present disclosure. As shown in FIG. 8, the electronic device 1000 includes an imaging device 1010 of the eighth embodiment of the present disclosure.

The present disclosure has been described above with some embodiments mentioned above. However, the present disclosure is not limited to the embodiments, but various modifications can be made. In addition, various other substitutions and modifications will occur to those skilled in the art. Therefore, all such substitutions and modifications are intended to be embraced within the scope of the present disclosure as defined in the appended claims.

What is claimed is:

1. An optical imaging lens comprising, in order from an object-side to an image side:
   an aperture;
   a first lens with positive refractive power, having an image-side surface being convex;
   a second lens with negative refractive power, having an object-side surface being convex and an image-side surface being concave;
   a third lens with positive refractive power, having an object-side surface being convex and an image-side surface being convex which are both aspheric surfaces;
   a fourth lens with positive refractive power, having an object-side surface being concave and an image-side surface being convex which are both aspheric surfaces; and
   a fifth lens with negative refractive power, having an object-side surface being convex and an image-side surface being concave which are both aspheric surfaces, wherein each of the object-side surface and the image-side surface of the fifth lens includes at least one inflection point; wherein, the optical imaging lens includes a total number of five lens elements; the following conditions are satisfied:

$dNd1/dT \leq 1 \times 10^{-5}$;

$-3.5 \leq f2*(1/f3+1/f4) \leq -1$; and $0.24 \leq (CT3+CT4)/TTL \leq 0.39$;

where dNd1/dT is a temperature coefficient of refractive index of the first lens; f2 is a focal length of the second lens; f3 is a focal length of the third lens; f4 is a focal length of the fourth lens; CT3 is a thickness of the third lens on an optical axis of the optical imaging lens; CT4 is a thickness of the fourth lens on the optical axis of the optical imaging lens; TTL is a total track length of the optical imaging lens.

2. The optical imaging lens of claim 1, wherein the following condition is satisfied:

$0 < R4/R5 \leq 0.5$;

where R4 is a curvature radius of the image-side surface of the second lens and R5 is a curvature radius of the object-side surface of the third lens.

3. The optical imaging lens of claim 1, wherein the following condition is satisfied:

$0.8 \leq AT23/AT34 \leq 3.5$;

where AT23 is a distance from the image-side surface of the second lens to the object-side surface of the third lens along the optical axis of the optical imaging lens; AT34 is a distance from the image-side surface of the third lens to the object-side surface of the fourth lens along the optical axis of the optical imaging lens.

4. The optical imaging lens of claim 1, wherein the following condition is satisfied:

$|Vd5-Vd2| \leq 15$;

where Vd2 is an abbe number of the second lens and Vd5 is an abbe number of the fifth lens.

5. The optical imaging lens of claim 1, wherein the following condition is satisfied:

$Vd1 \geq 40$;

where Vd1 is an abbe number of the first lens.

6. The optical imaging lens of claim 1, wherein the following condition is satisfied:

$1.9 \leq TTL/ImgH \leq 2.2$;

where TTL is a total track length of the optical imaging lens; ImgH is a maximum image height of the optical imaging lens.

7. The optical imaging lens of claim 1, wherein an object-side surface of the first lens is convex.

8. The optical imaging lens of claim 1, wherein an off-axis region of the object-side surface of the fifth lens is concave.

9. The optical imaging lens of claim 1, wherein an off-axis region of the image-side surface of the fifth lens is convex.

10. An imaging device, comprising the optical imaging lens of claim 1 and an image sensor, wherein the image sensor is disposed on an image plane of the optical imaging lens.

11. An electronic device, comprising the imaging device of claim 10.

* * * * *